United States Patent
Tarumizu

[11] Patent Number: 5,983,483
[45] Date of Patent: Nov. 16, 1999

[54] FREEZING TYPE WORKPIECE FIXING METHOD

[76] Inventor: Yoshitaka Tarumizu, 1164-12, Ichigao-cho, Aoba-ku, Yokohama-shi Kanagawa, 225, Japan

[21] Appl. No.: 09/025,024

[22] Filed: Feb. 17, 1998

[30] Foreign Application Priority Data

Feb. 17, 1997 [JP] Japan .................................. 9-048496

[51] Int. Cl.$^6$ ............................................... B23Q 7/00
[52] U.S. Cl. .............................................................. 29/559
[58] Field of Search ........................ 269/7, 8, 21; 451/364

[56] References Cited

U.S. PATENT DOCUMENTS

| | | | |
|---|---|---|---|
| 3,953,013 | 4/1976 | Griffith | 269/7 |
| 5,357,762 | 10/1994 | Charton | 269/7 |
| 5,762,736 | 6/1998 | Herbert et al. | 269/7 |

FOREIGN PATENT DOCUMENTS

| | | | |
|---|---|---|---|
| 3049359 | 7/1982 | Germany | 269/7 |
| 0500007 | 1/1976 | U.S.S.R. | 269/7 |

*Primary Examiner*—David A. Scherbel
*Assistant Examiner*—Daniel G. Shanliy
*Attorney, Agent, or Firm*—Michael J. Striker

[57] ABSTRACT

A workpiece fixing method capable of machining a workpiece with high accuracy by firmly fixing the workpiece with no necessity of using a special freezing chuck device is provided. For this purpose, a macromolecular freezing agent having the freezing point hither than that of water and represented by silicone oil is interposed at least between the workpiece and the surface of a fixing jig under which a fluid at a temperature lower than the freezing temperature of the macromolecular freezing agent is operated on the fixing jig during a time period of machining the workpiece whereby the macromolecular freezing agent is cooled and frozen and the workpiece is adhered and fixed.

21 Claims, 13 Drawing Sheets

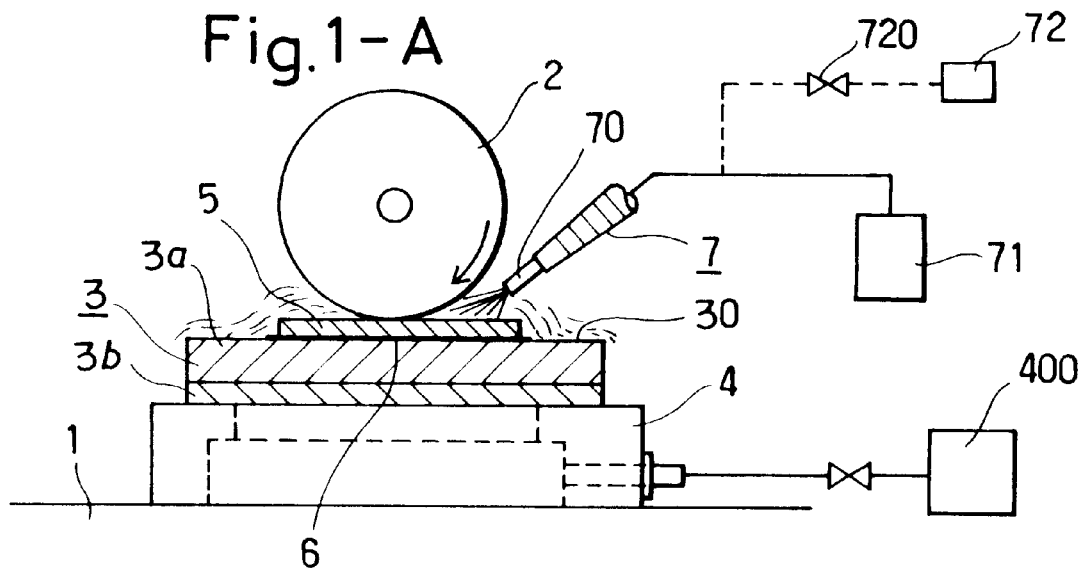
Fig.1-A
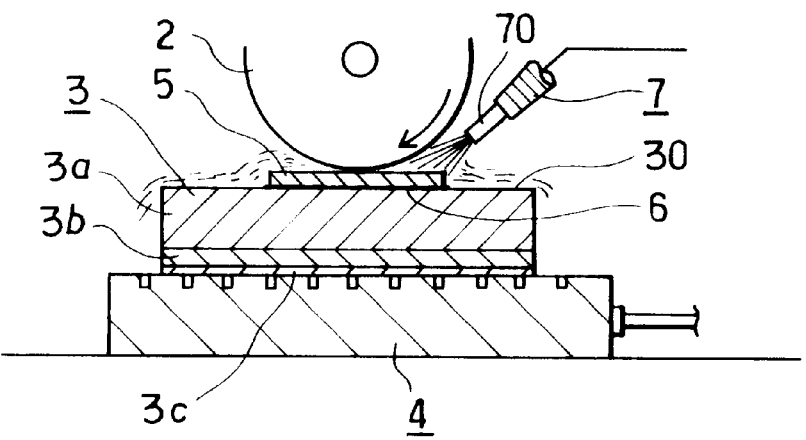
Fig.1-B
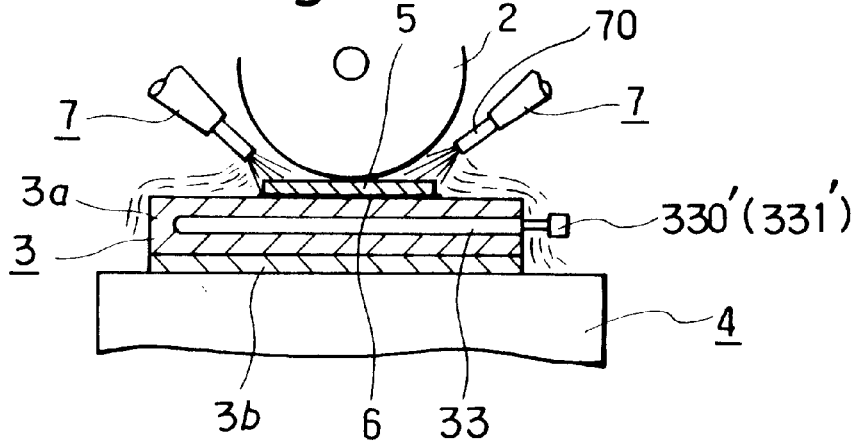
Fig.1-C

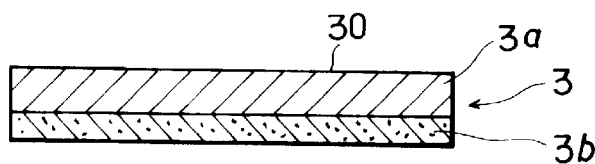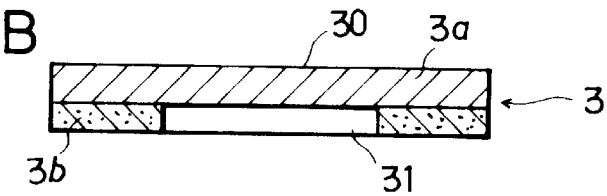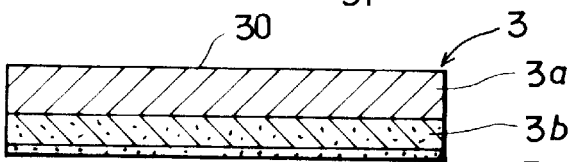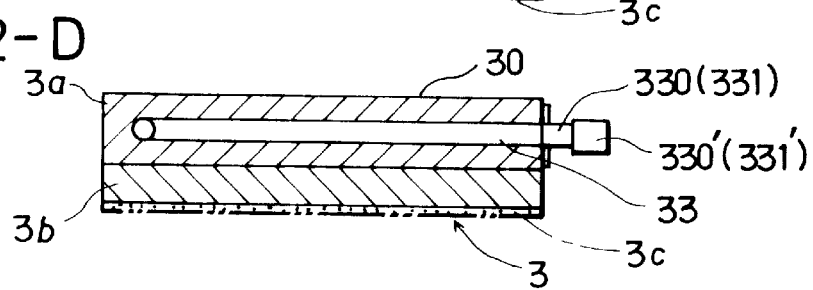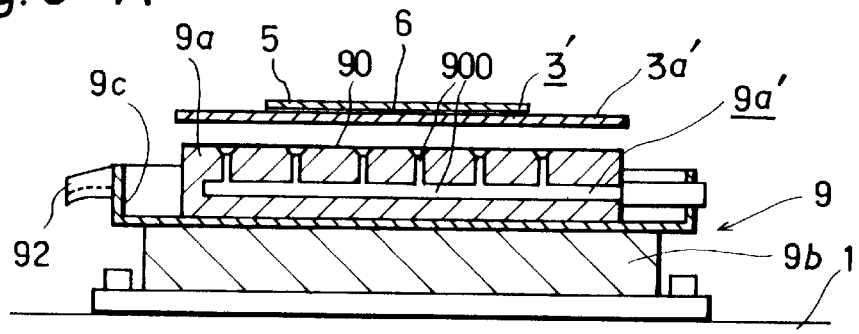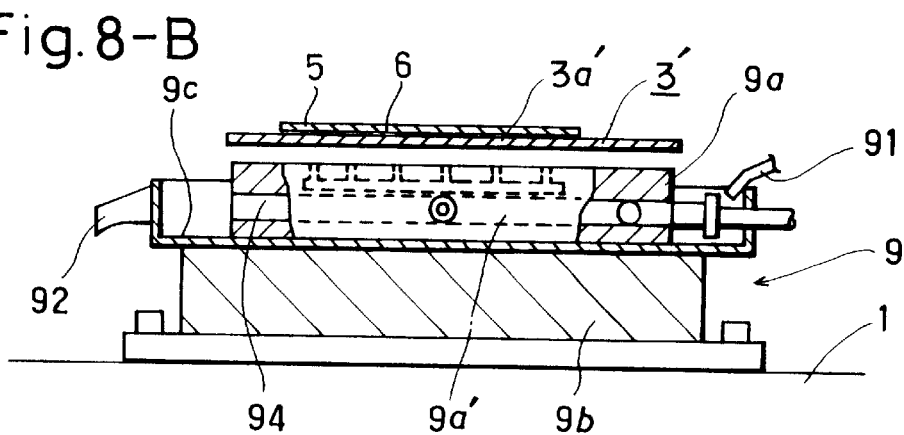

Fig.3-A
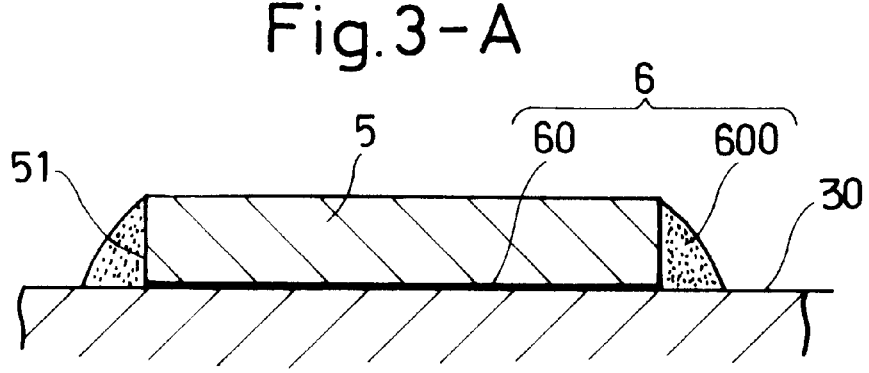
Fig.3-B
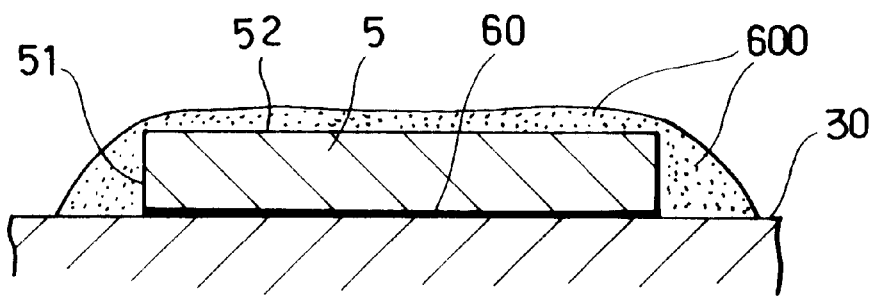
Fig.3-C
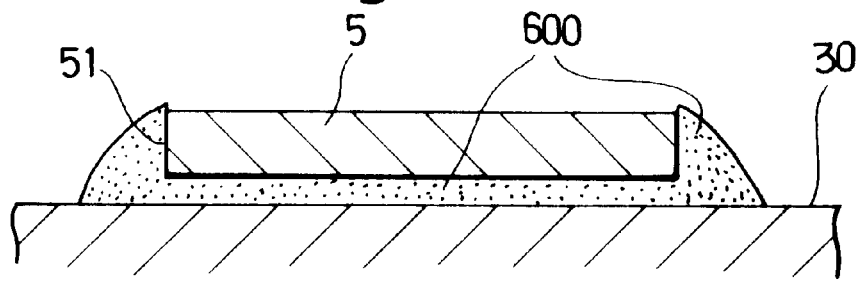
Fig.3-D
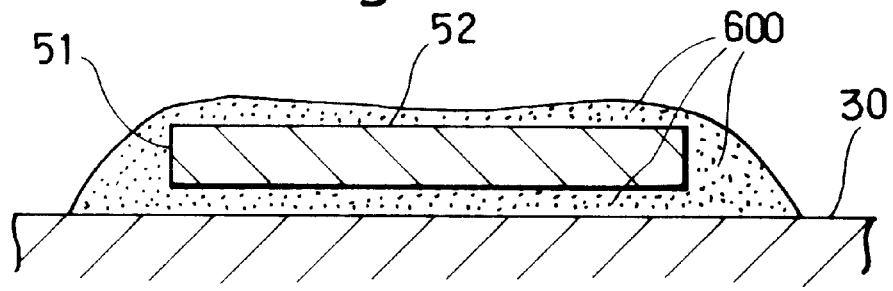

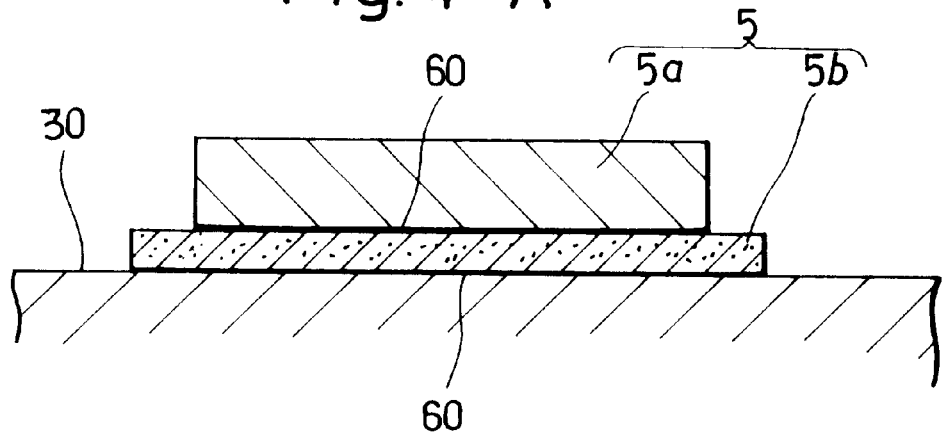
Fig. 4-A
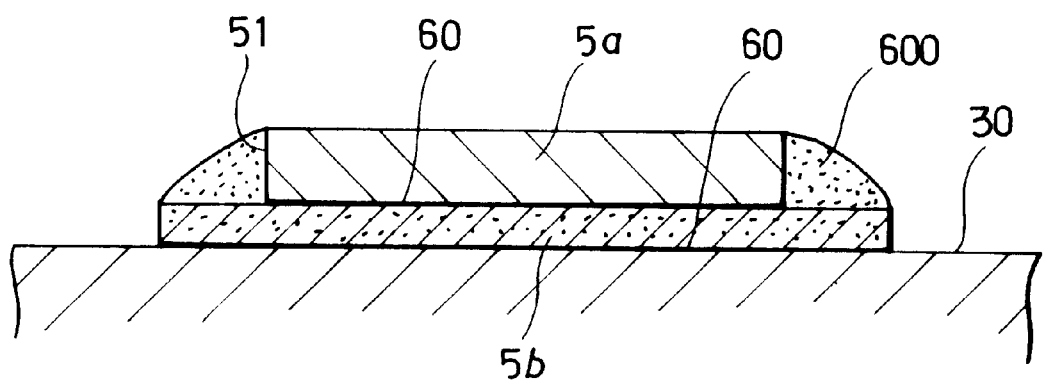
Fig. 4-B
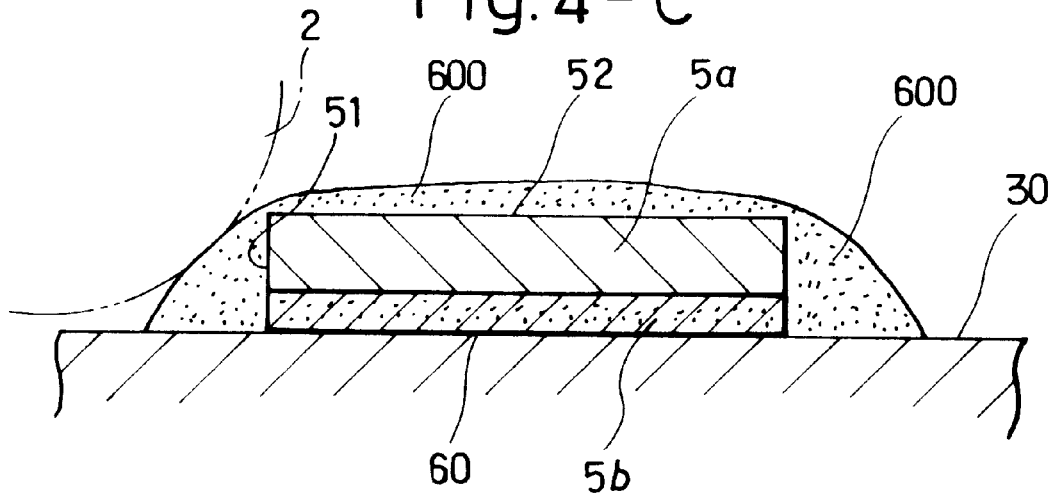
Fig. 4-C

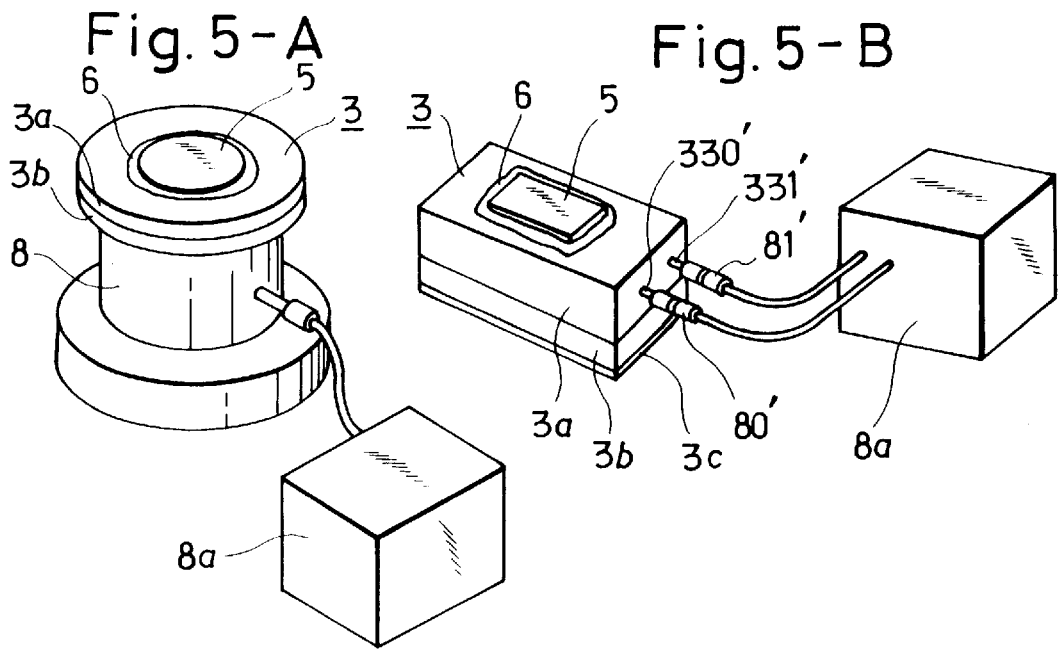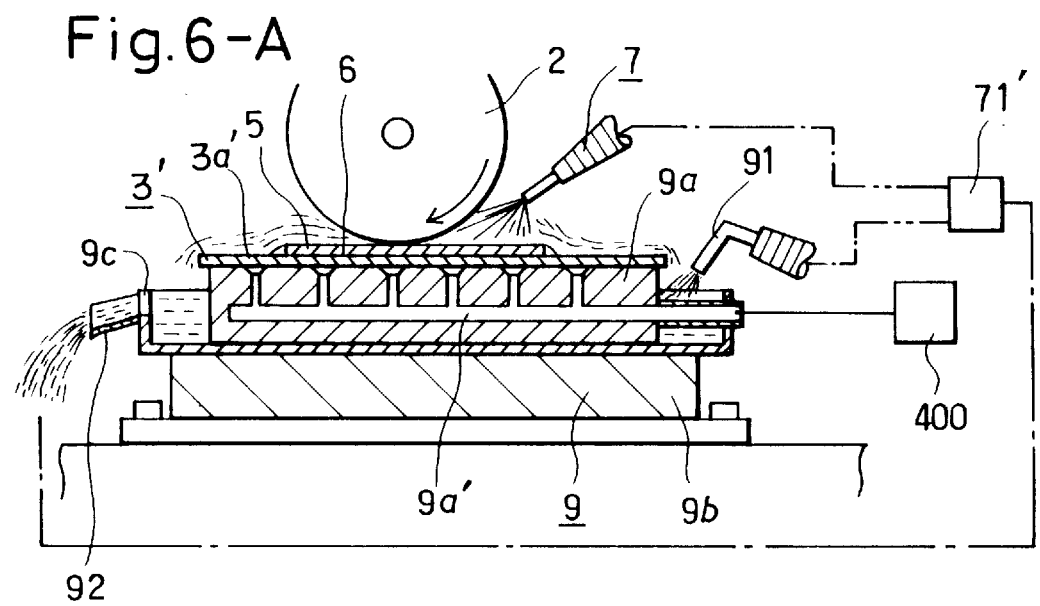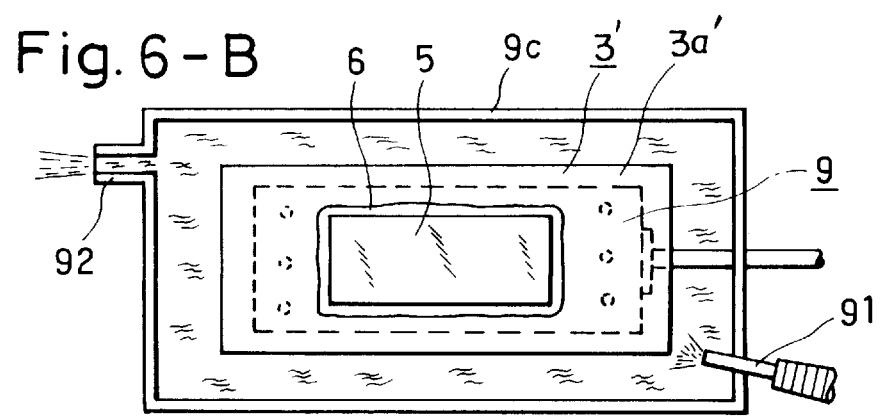

Fig. 7-A
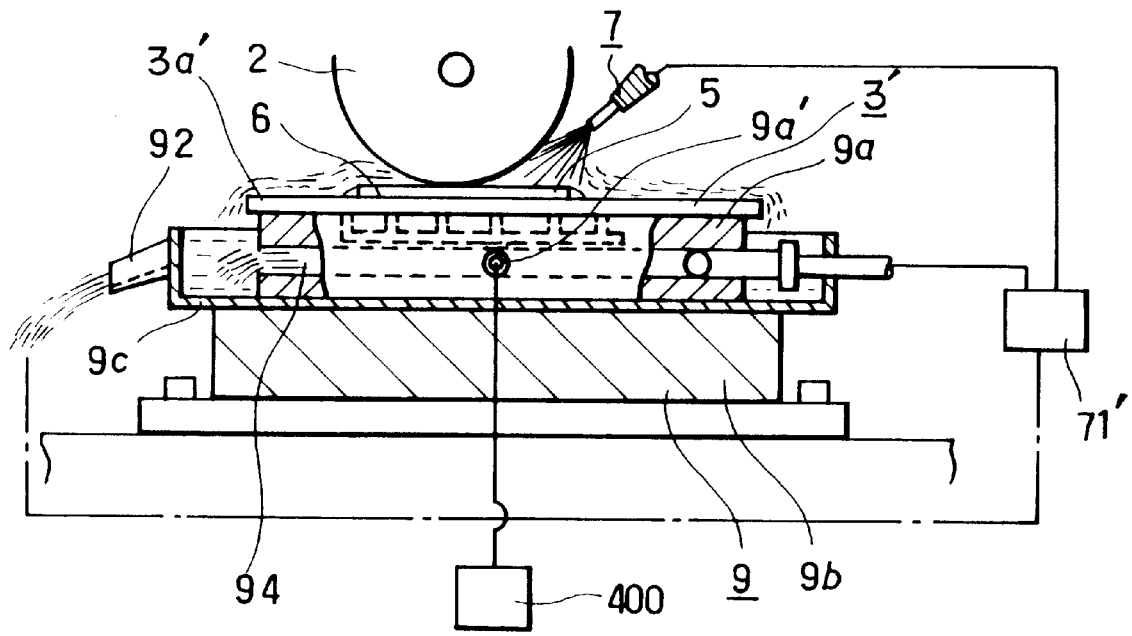
Fig. 7-B
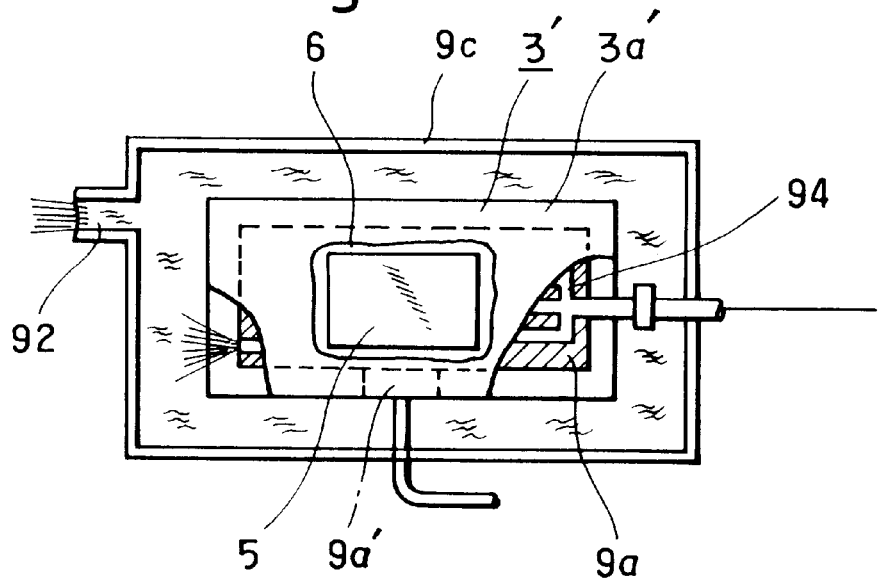

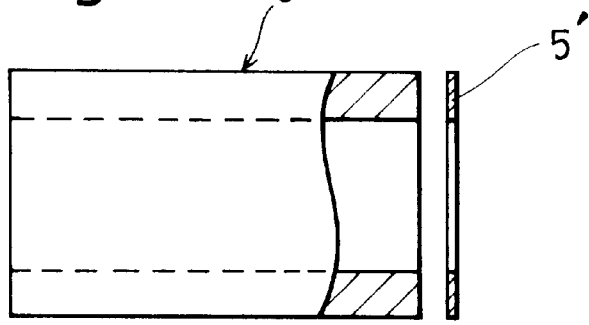
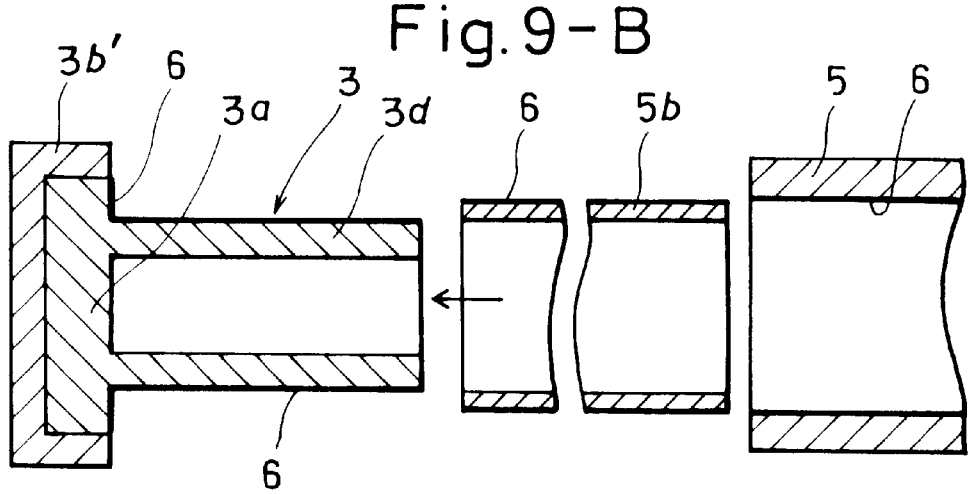
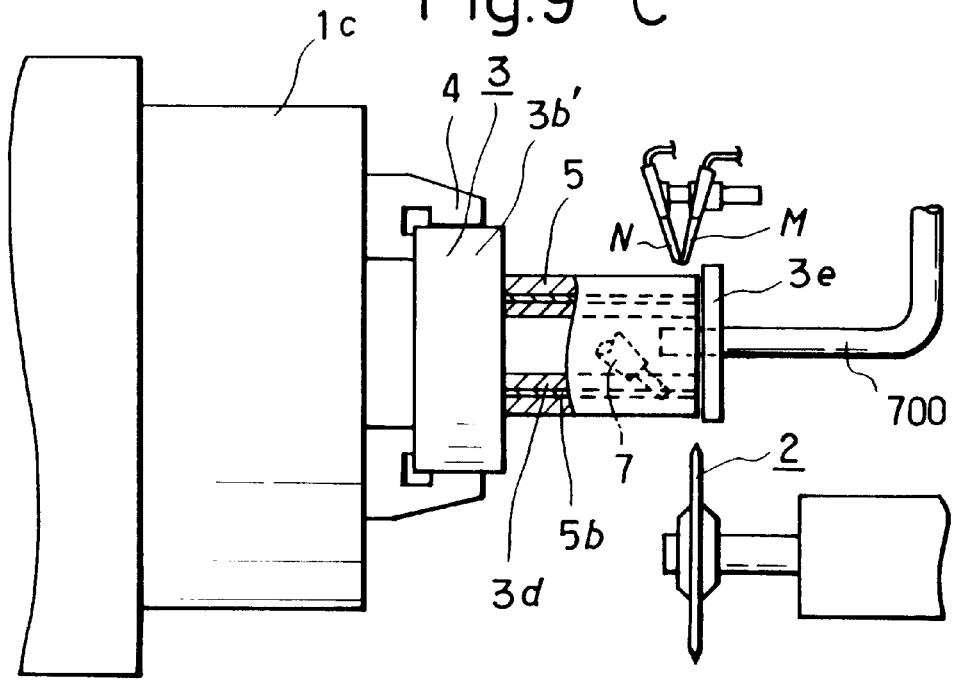

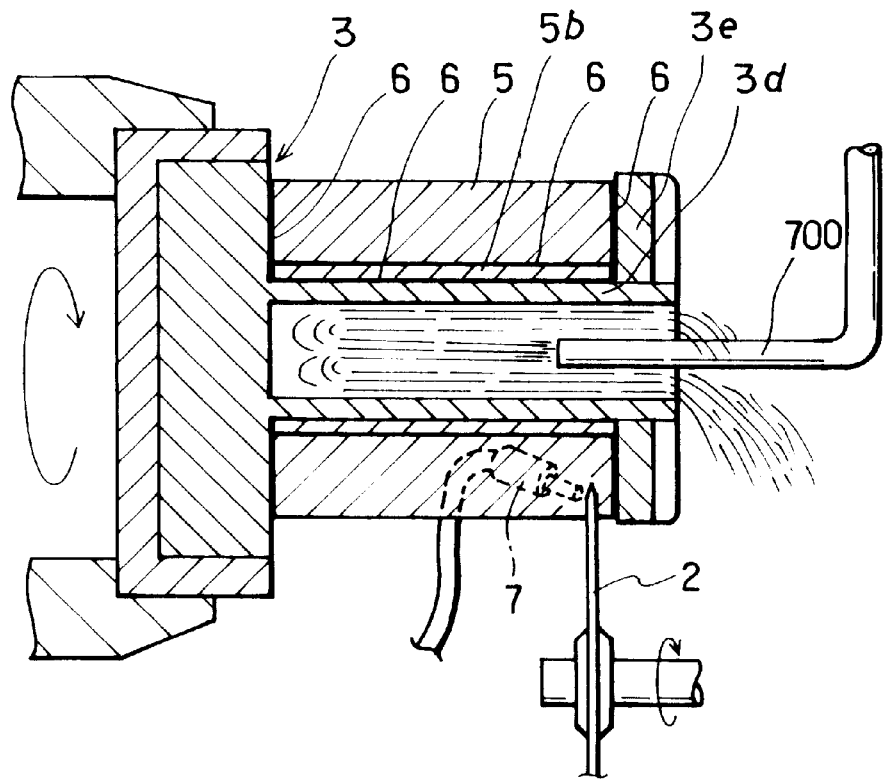
Fig.10-A
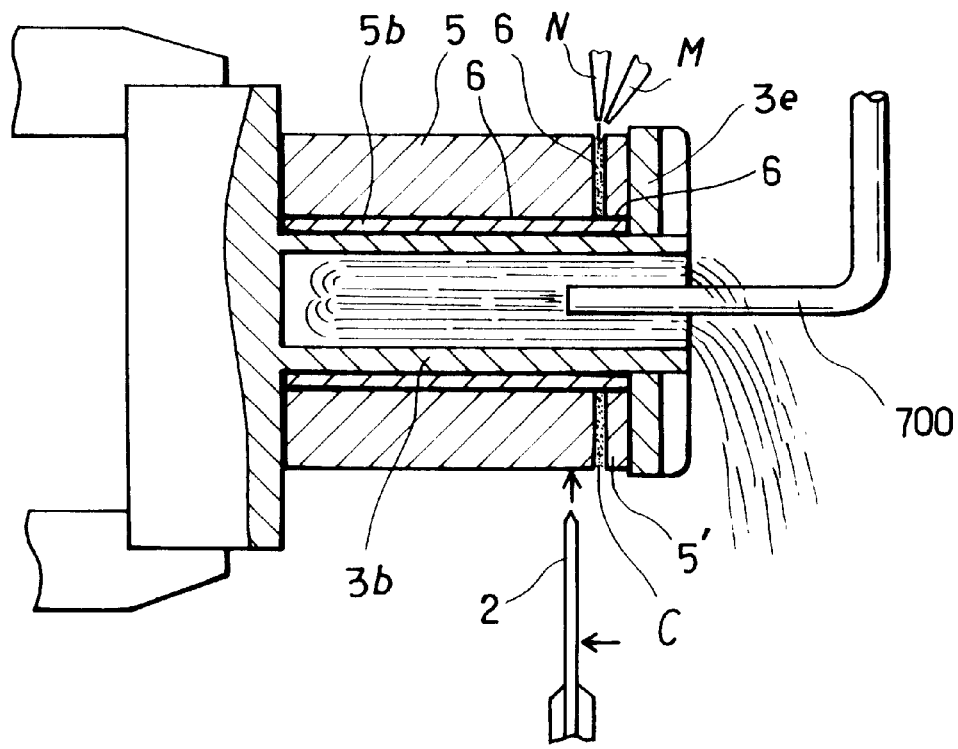
Fig.10-B

Fig.11-A
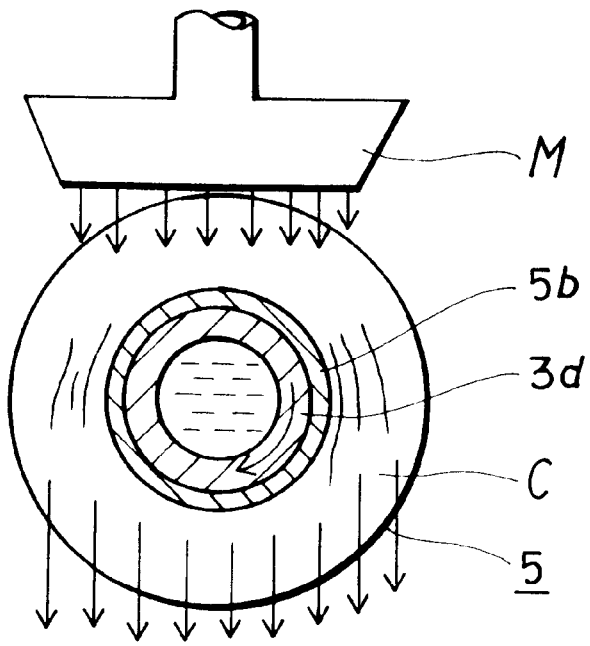
Fig.11-B
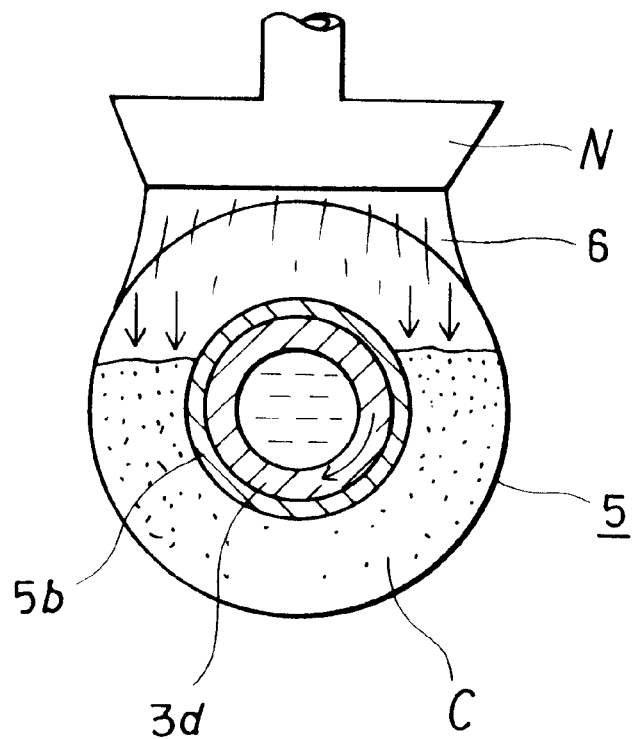

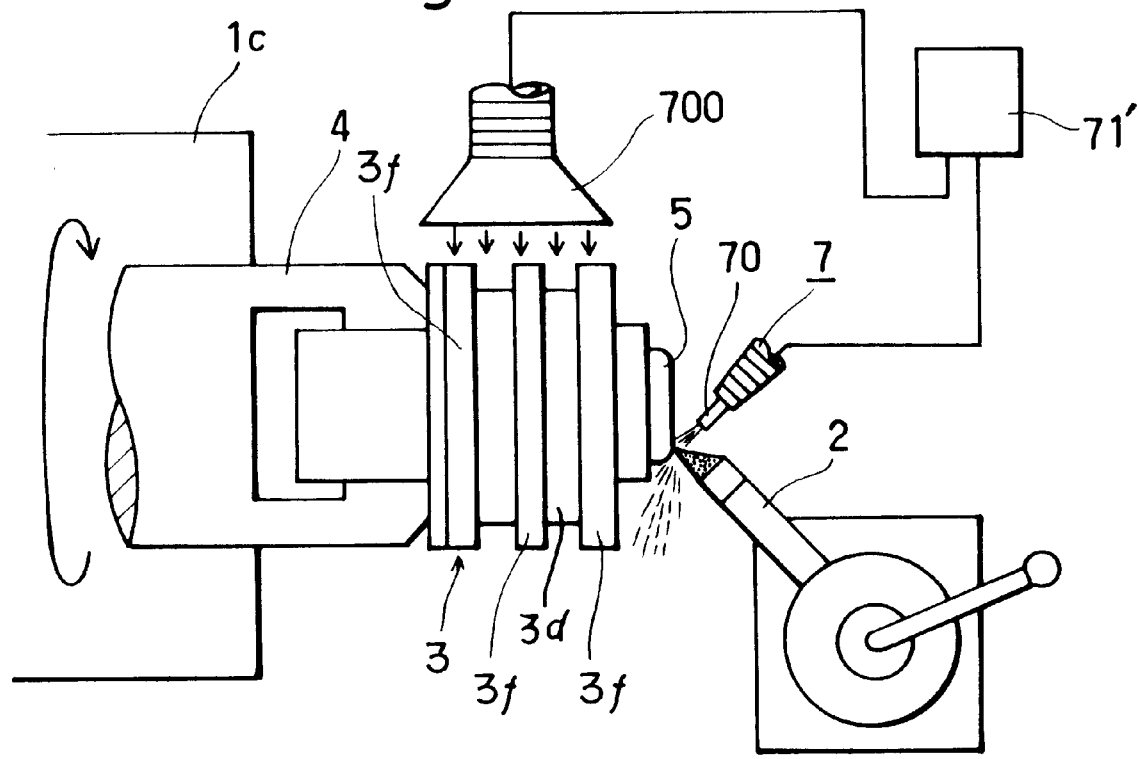
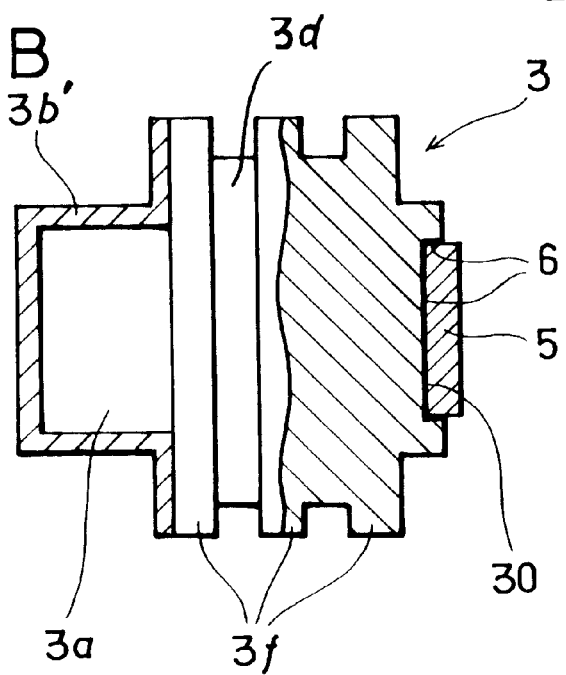

Fig. 13
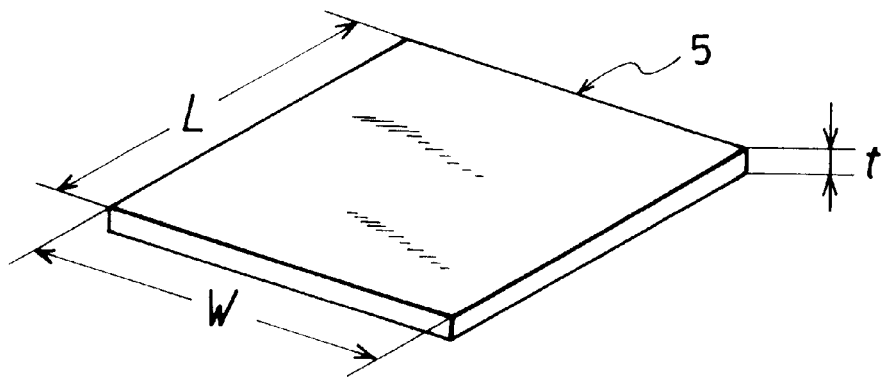
Fig.14-A 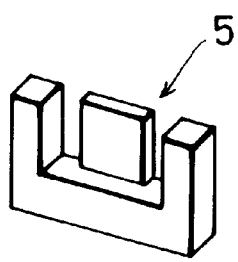 Fig.14-B 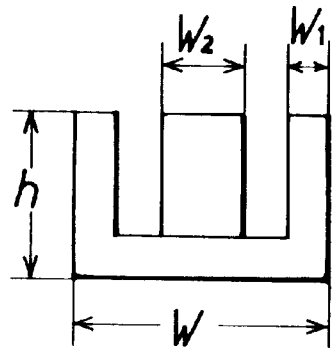 Fig.14-C 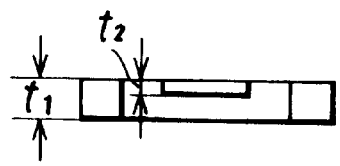
Fig.14-D 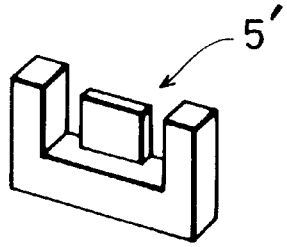 Fig.14-E 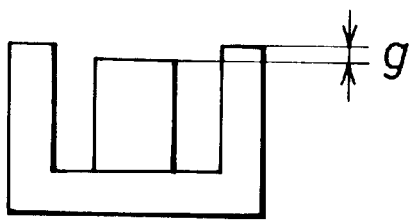

Fig.15-A
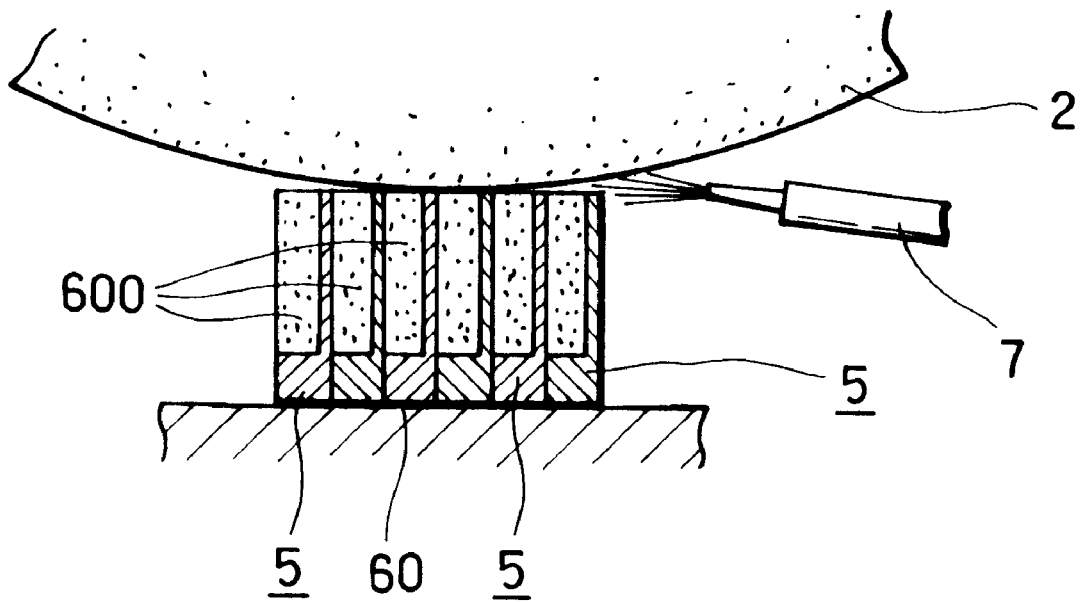
Fig.15-B
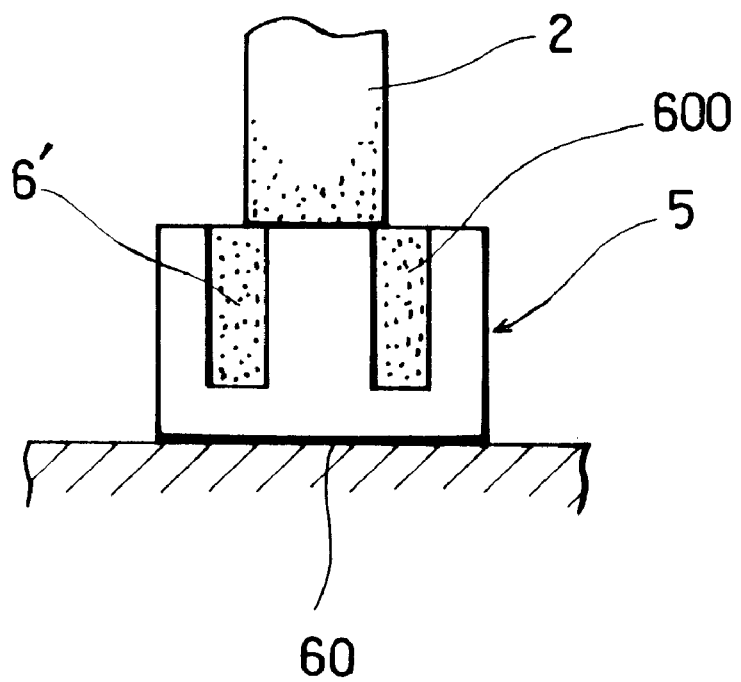

Fig.16-A
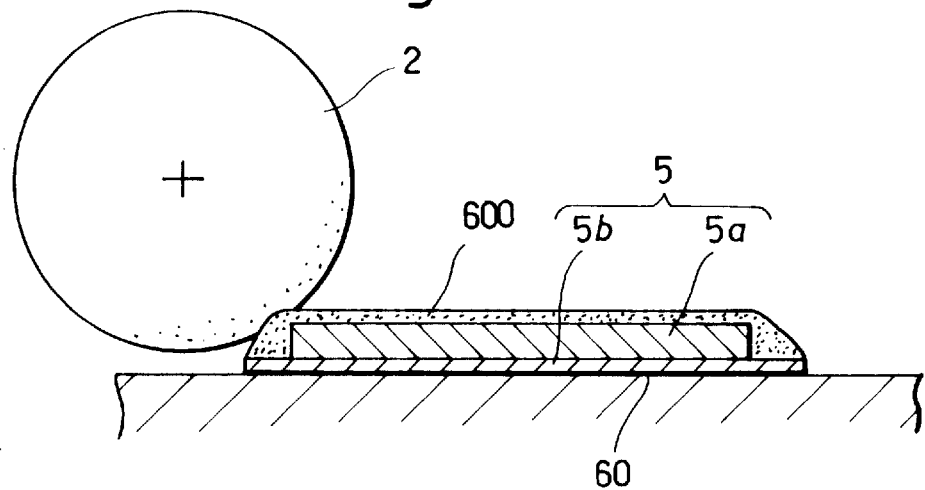
Fig.16-B
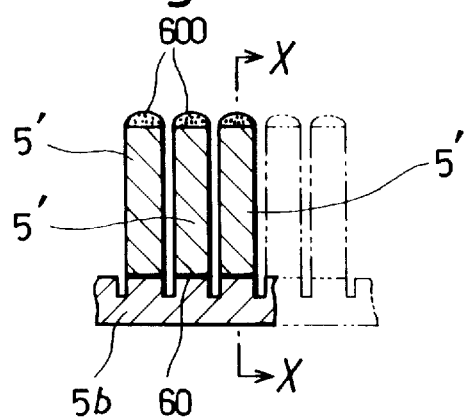
Fig.16-C
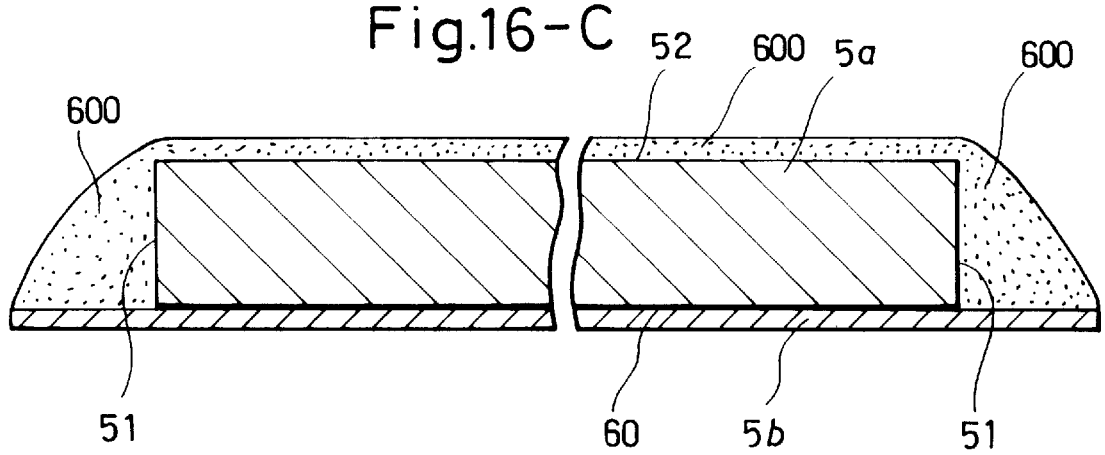

FREEZING TYPE WORKPIECE FIXING METHOD

FIELD OF THE INVENTION

The present invention relates to a method of fixing a workpiece, particularly to an improvement in a freezing type fixing method for machining a workpiece.

BACKGROUND OF THE INVENTION

In machining a workpiece, the workpiece needs to be fixed firmly to a working machine. Although, conventionally, a magnetic chuck, a vacuum chuck, a vice or the like has generally been used as means for fixing a workpiece, the workpiece may not be fixed firmly and stably when the workpiece is thin, easy to destruct or provided with a complicated shape where restrictions are imposed on material, shape or the like of the workpiece.

As a counter measure therefor, a freeze chuck process and device with ice as an adhesion medium has been proposed. According to the related art, a freezing plate comprising a material excellent in the thermal conductivity such as copper or the like and a freeze chuck device are used, water is coated on the freezing plate in spray, a workpiece is mounted thereon, the freezing plate is placed on the freeze chuck device under this state, and electricity is conducted in a thermoelement of the freeze chuck device by which temperature of a top face of the freezing plate is cooled down to 0° C. or lower to thereby freeze water and fix the workpiece by a film of ice.

However, there have been posed the following problems in such a related art.

(1) The device cost is higher than that of a generally-used workpiece fixing process and the efficiency of attaching and detaching a workpiece is poor.

Although according to the related art, water is frozen and a workpiece is fixed by a film of ice, actually, a sufficient fixing force cannot be provided unless the temperature of the top face of the freezing plate is lowered to temperatures lower than −5° C., for example, about −10° C. Further, the workpiece cannot be taken out unless the temperature is elevated to 0° C. or higher after the machining operation. Therefore, an expensive and complicated device is needed, the working cost is increased and the operational efficiency is poor since a long period of time is required in fixing and detaching the workpiece on the freezing plate.

(2) It is extremely difficult to carry out machining operation by using a machining fluid and a workpiece may be detached from a fixing face or detached from a table during machining operation. Further, even when the machining operation can be carried out, burr or defect may be caused and high accuracy working cannot be performed.

That is, it is appropriate to use a machining fluid for removing heat of working generated between a workpiece and a tool during the machining operation, lubricating the tool, evacuating chips and so on. However, the temperature of the machining fluid is generally higher than the temperature of ice fixing the workpiece. Therefore, when the machining fluid is supplied to a working face, the film of ice is melted, the machining operation cannot be carried out since the workpiece is detached from the fixing face and further, the workpiece jumps out of a table, which is extremely dangerous.

Even when a water-soluble machining solution including an antifreezing solution is used and the machining solution is cooled down to a freezing point or lower as a counter measure therefor, since ice is provided with strong affinity for water, the machining solution is liable to melt ice fixing the workpiece and the workpiece is liable to release from a fixed state. Therefore, the method in the related art is actually applicable only to a dry machining process where a machining solution is not used.

(3) The movement of a tool is liable to hamper by lamination of ice on a workpiece during the machining operation and therefore, high accuracy machining in respect of dimensions and shape is difficult to perform.

For example, when a workpiece is cut or diced, during the machining operation, a water-soluble machining solution or moisture in air are frozen and laminated on the workpiece. The ice is brought into contact with a flange, a mandrel or the like of the tool by which the movement of the tool is hampered and therefore, precision machining is difficult to perform or accident of destructing the tool or a main spindle is liable to cause.

Therefore, when an object of a thin film is machined, diced or sliced, a workpiece is fixed not by a freezing process but by using wax or the like, however, according to this process, a long period of time (normally 30 minutes or more) is required in adhering the workpiece, and a long period of time is required in removing the wax after machining, which is very poor in the operational efficiency and the operational performance. Furthermore, the fixing force is weak and insecure in respect of the wax or the like and therefore, the machining accuracy is deteriorated and deformation of the workpiece is caused by heat generation since the workpiece cannot be applied with a machining solution. Particularly, machining of cutting or the like in respect of a fine ceramics group, a boron group, a cobalt group and the like is almost impossible since certainty in fixing a workpiece is deficient.

(4) Restriction is imposed on a shape of a workpiece, for example, when a product having a donut-like shape and a thickness of 0.5 mm or smaller is sliced from a cylindrical workpiece, the fixing force of the workpiece is deficient and chipping cannot be prevented and therefore, high accuracy machining cannot be carried out.

The present invention has been created by carrying out researches in order to resolve the above-described problems and it is a basic object of the present invention to provide a workpiece fixing method capable of machining a workpiece with high accuracy by firmly fixing the workpiece without using a special freeze chuck device and yet capable of detaching the workpiece swiftly and simply after machining or the like at low cost.

Further, it is other object of the present invention to provide a workpiece fixing method capable of carrying out highly accurately and simply a slicing operation for obtaining a donut-like product of a thin layer from a cylindrical workpiece, a polishing or slicing operation of inner and outer faces of a cylinder and a polishing or cutting operation of end faces of a cylinder.

SUMMARY OF THE INVENTION

In order to achieve the above-described object, according to the present invention, conception has been converted and a workpiece is stably fixed by utilizing a fluid used in machining the workpiece by using a special medium for fixing.

That is, a macromolecular freezing agent having the freezing point higher than that of water is interposed at least between the workpiece and the surface of a fixing jig under which a fluid at a temperature lower than the freezing temperature of the macromolecular freezing agent is operated in machining the workpiece by which the macromolecular freezing agent is cooled and frozen and the workpiece is adhered to the fixing jig, which is the basic feature of the present invention.

On the basis of the basic feature of the present invention, representatively, the following aspects of the present invention are adopted.

1) According to an aspect of the present invention, there is provided a freezing type workpiece fixing method, wherein a fixing jig having a main body having excellent thermal conductivity with a surface thereof constituting a fixing face and a base comprising a thermally insulating material is used, the fixing jig is fixed to a jig fixing device on a side of a working machine, a macromolecular freezing agent is interposed at least between the fixing face of the fixing jig and the workpiece and a fluid is supplied at least to a workpiece machining region to thereby cool simultaneously the surface of the fixing jig.

2) According to another aspect of the present invention, there is provided a freezing type workpiece fixing method, wherein a fixing jig having a main body having excellent thermal conductivity with a surface thereof constituting a fixing face and a base comprising a thermally insulating material is used, a workpiece is fixed by freezing a macromolecular freezing agent by cooling the fixing jig in which the macromolecular freezing agent is interposed at least between a fixing face and the workpiece previously at outside of a working machine, the fixing jig to which the workpiece has been fixed is fixed to a jig fixing device on a side of the working machine and a fluid is supplied at least to a workpiece machining region to thereby cool the surface of the fixing jig.

3) According to another aspect of the present invention, there is provided a freezing type workpiece fixing method, wherein a pallet having excellent thermal conductivity is used as a fixing jig, a jig fixing device having a main body having excellent thermal conductivity and fixing means capable of fixing attachably and detachably the pallet and a tank surrounding the main body is installed on the side of a working machine, the pallet is fixed to the main body, a macromolecular freezing agent is interposed at least between the pallet and a workpiece and the pallet is cooled by cooling the jig fixing device by supplying a fluid at a temperature lower than the freezing temperature of the macromolecular freezing agent into the tank to thereby freeze the macromolecular freezing agent.

4) According to another aspect of the present invention, there is provided a freezing type workpiece fixing method, wherein a pallet having excellent thermal conductivity is used as a fixing jig, a jig fixing device having a main body having excellent thermal conductivity and fixing means capable of fixing attachably and detachably the pallet and a tank surrounding the main body is installed, a workpiece is adhered and fixed to the pallet by freezing a macromolecular freezing agent by previously cooling the pallet in which the macromolecular freezing agent is interposed at least between the workpiece and the pallet at outside of a working machine, the pallet is fixed to the jig fixing device and meanwhile, the pallet is cooled by cooling the pallet fixing jig by supplying a fluid at a temperature lower than the freezing temperature of the macromolecular freezing agent into the tank.

5) According to another aspect of the present invention, there is provided a freezing type workpiece fixing method, wherein a fixing jig having a main body comprising a material having excellent thermal conductivity and a shaft portion extended outwardly from the main body is used, a workpiece is attached to the shaft portion via a macromolecular freezing agent and a fluid at a temperature lower than the freezing temperature of the macromolecular freezing agent is supplied to the shaft portion continuously during a time period of machining the workpiece to thereby adhere and fix the workpiece by freezing the macromolecular freezing agent.

According to the macromolecular freezing agent as an element for fixing the workpiece in the present invention, it is an indispensable characteristic that the freezing point is higher than that of water and in addition thereto, it is necessary for the macromolecular freezing agent to be provided with chemically stable physical properties at least having excellent water repellency.

As a preferable example of the macromolecular freezing agent, silicone oil or an agent whose major component is silicone oil, particularly, octamethylcyclotetrasiloxane represented by chemical symbol of $Si_4C_8H_{24}O_4$ or an agent whose major component is octamethylcyclotetrasiloxane. The silicone oil includes compounds referred to in market as low molecular weight silicone oil, a tetramer of cyclic silicone oil, cyclic dimethyl siloxane, cyclic dimethyl silicone oil and so on and the freezing temperature of these are 10° C. or higher. In the following, silicone oil according to the present invention indicates these compounds.

The state of the macromolecular freezing agent includes all of from a liquid state to a cream-like form (butter-like form) or a paste-like form. The viscosity of an agent in a cream-like form (butter-like form) or a paste-like form is adjusted by adding solid particles to silicone oil and mixing them. Powders, preferably fine powders of various materials can be used as the solid particles.

Further, the present invention includes a case where either of the macromolecular freezing agent in a liquid state and the macromolecular freezing agent in a cream-like form or a paste-like form is used and a case of using both of them. When the macromolecular freezing agent in a cream-like form or a paste-like form is used to connect the surrounding of a workpiece and a fixing face, the workpiece can be fixed very effectively.

According to the present invention, a fluid used for freezing the macromolecular freezing agent is at least either one of liquid, gas and a mixture of liquid and gas. Such a fluid includes a machining fluid supplied for machining a workpiece in addition to a fluid in the case where it is used exclusively for freezing the macromolecular freezing agent.

A representative one of the machining fluid is a machining solution and the machining solution is provided with at least one of cooling operation for removing heat of machining, lubrication operation, operation of washing of machine chips or abrasive grains and rust proof operation and includes various solutions referred to as coolant solution, polishing solution, cutting solution and so on. The machining solution may be either of water, water-soluble solution (emulsion type, soluble type and solution type) and non-water-soluble solution. However, the machining fluid includes not only a fluid in the case of a pure liquid but fluids in cases of a mixture of liquid and gas and only gas. Representative gases are cooling air and cooling inert gas and their temperatures are selected in accordance with the material of a workpiece and heat of working.

However, it is necessary that the machining fluid does not include a component for dissolving the macromolecular freezing agent (mainly, aromatic hydrocarbon, aliphatic hydrocarbon and chlorinated hydrocarbon) and is provided with a temperature lower than the freezing temperature of the macromolecular freezing agent (temperature lower than freezing temperature by 3° C. or more, preferably, 5° C. or more).

The cooling C by the macromolecular freezing agent by using the machining fluid may be carried out by utilizing injection and flow of the working fluid to a portion where a workpiece is brought into contact with a tool or the machining fluid may be supplied separately from supply thereof to the portion where a workpiece is brought into contact with a tool. In the latter case, supply of the machining fluid is not limited to supply from outside of a fixing jig but may be from inside thereof.

Examples of workpieces machined by applying the present invention include metals represented by any materials of iron group, copper group, aluminum group, titanium group, silicon group, germanium group, cobalt group, plastic group, glass group, carbon group, ceramic group, wood group, composites of two or more of these, quartz, diamond, CBN, ruby, sapphire and so on having any shape or dimensions. The shape of a workpiece is arbitrary such as block, rod, pipe and so on.

The machining also includes various kinds of cutting, various kinds of grinding such as surface grinding, formulation grinding, creep grinding, cylindrical grinding and so on and turning, polishing, cutting, slicing, dicing, milling, grooving, boring, engraving and the like.

When the machining is carried out on the surface of a workpiece, the workpiece may directly be fixed to a fixing jig. However, when the machining element penetrates through a range of wall thickness as in cutting or boring, an allowance member is interposed between a workpiece and a fixing face in order to prevent contact of a tool in respect of a face for fixing the workpiece. The present invention covers this case and accordingly, "workpiece" according to the present invention is a concept including a workpiece inherently as an object of machining and the inherent workpiece laminated with an allowance member.

According to the present invention, the macromolecular freezing agent having the freezing point higher than that of water is disposed between a workpiece and a fixing face of a fixing jig and the workpiece is fixed with the high molecular freezing agent as a medium of adhesion. Therefore, even when the fixing face is at a temperature exceeding 0° C., the fixing force sufficiently withstanding strong mechanical working force is provided. Further a time period required for freezing the macromolecular freezing agent is instantaneous and therefore, the operation of fixing a workpiece can be made significantly simple and efficient. So far as the working fluid is at a temperature that is equal to or lower than the freezing temperature of the macromolecular freezing agent, the workpiece can stably be frozen and fixed by the macromolecular freezing agent by injecting or blowing the macromolecular freezing agent to the workpiece and/or the fixing jig in machining the workpiece or dipping the fixing jig into a liquid or passing the fluid in the fixing jig by which the machining can be carried out stably, firmly and with excellent accuracy.

Further, the macromolecular freezing agent as a substance for fixing a workpiece is provided with water repellency. Therefore, even when a water-soluble solution is used as the machining fluid, there is no danger of melting the macromolecular freezing agent. Further, the macromolecular freezing agent is water-repellent and therefore, even in the case where cutting, dicing, slitting or the like is carried out in respect of a silicon wafer, ceramics, a metal plate or the like, water is not frozen or laminated on the surface of the workpiece and there causes no phenomenon where a frozen compound is brought into contact with surrounding of the tool. Therefore, the movement of the tool is always kept smoothly and high accuracy machining can be carried out smoothly.

When an agent having a compound as a major component in a cream-like form or a paste-like form is used as the macromolecular freezing agent, a block of a large volume is constituted by freezing and solid particles operate as a kind of an aggregate. Therefore, the force for adhering and fixing the workpiece is much intensified and even when the force of machining the workpiece is strong, the workpiece can be maintained in a stable fixed state.

Particularly, when the cream-like or paste-like macromolecular freezing agent is coated on the surrounding of the workpiece such that agent is brought into contact with the fixing face and under the state, the macromolecular freezing agent is frozen, the workpiece is held and fixed by the macromolecular freezing agent which makes rigid firmly not only the lower face but the surrounding of the workpiece and accordingly, the workpiece is not flaked off from the fixing face even when the workpiece is sliced. Further, when the cream-like or paste-like macromolecular freezing agent is coated not only on the surrounding of the workpiece but is coated to cover the upper face of the workpiece, a sliced piece is solidly fixed by adhering layers on the both sides of the workpiece having a large volume and an upper face adhering layer connecting the adhering layers on the both sides of the workpiece in a shape of a bridge and therefore, even if the thickness of the sliced piece is thin, it does not flake off from the fixing face and is maintained at a stable state.

Furthermore, the macromolecular freezing agent can stably adhere and fix the workpiece onto the fixing face even at a temperature that is equal to or higher than 0° C. and accordingly, the fixed state of the workpiece can sufficiently be maintained by cooling operation by a fluid represented by a machining solution as mentioned above. Therefore, a special cooling device is not necessary and therefore, the device cost becomes extremely inexpensive and even in the case where the workpiece is fixed to the fixing jig by freezing previously the macromolecular freezing agent at outside for successive machining operation, a means for cooing thereof having a cooling function for cooling the assembly at a temperature pertinently lower than the freezing temperature of the macromolecular freezing agent, can be used. Therefore, a water passing system by a fluid represented by water or a dipping tank is sufficient. Accordingly, also in this case, the device cost is inexpensive.

Furthermore, according to the present invention, as means for fixing the fixing jig to a table of a working machine, a general chuck represented by a mechanical chuck of bolt type or claw type, a vacuum chuck, a magnetic chuck can be used and therefore, the device can be made extremely simple and inexpensive. Further, detachment of a machined workpiece from the fixing jig can be carried out extremely simply and efficiently.

Even in the case where a cylindrical workpiece is used and sliced into a donut-like shape of 1 mm or smaller, a fixing jig comprising a main body made of a material having excellent thermal conductivity and a shaft portion extended outwardly from the main body may be used, the workpiece may be mounted on an outer periphery or a front end portion of the shaft portion via the macromolecular freezing agent and a fluid at a low temperature lower than the freezing temperature of the macromolecular freezing agent may continuously be supplied to the shaft portion during a time period of machining the workpiece. In this way, by cooling the shaft portion, the macromolecular freezing agent is frozen by which the workpiece is adhered and fixed and accordingly, the workpiece can firmly be fixed. Further, the inner diameter's side of a sliced donut-like product is bonded onto the outer periphery of a mandrel by the macromolecular freezing agent and therefore, the product is firmly held without being scattered. Accordingly, a product having excellent surface roughness of a finished surface can accurately and efficiently be machined.

Further, according to the present invention, processings after machining the workpiece are facilitated. That is, only the macromolecular freezing agent or the agent and the workpiece which have been used are charged into water (including water blent with antifreezing agent or the like) at a temperature higher than the freezing temperature of the macromolecular freezing agent. Thereby, the macromolecular freezing agent is melted, separated and floated up on the surface of water and therefore, when the floated-up macromolecular freezing agent is taken out and is injected into a tank filled with water at a temperature within a range of freezing the macromolecular freezing agent, the macromolecular freezing agent can simply be recovered. According to the method, washing of machine chips or the like adhered to the workpiece and recovery of the macromolecular freezing agent can be carried out by simple and inexpensive means.

Although other features or advantages of the present invention will be clarified in the detailed description as follows, so far as the basic feature of the present invention is provided, the present invention is not limited to constitutions indicated by embodiments but it is apparent that a skilled person can change or modify variously the present invention without being deviated from the scope of the present invention.

BRIEF DESCRIPTION OF THE DRAWINGS

FIG. 1-A is a sectional view schematically showing a first example of a first embodiment of a freezing type workpiece fixing method according to the present invention;

FIG. 1-B is a sectional view schematically showing a second example of the first embodiment of a freezing type workpiece fixing method according to the present invention;

FIG. 1-C is a sectional view schematically showing a third example of the first embodiment of a freezing type workpiece fixing method according to the present invention;

FIG. 2-A is a sectional view showing a first example of a fixing jig used in a freezing type workpiece fixing method according to the present invention;

FIG. 2-B is a sectional view similarly showing a second example of the fixing jig;

FIG. 2-C is a third view similarly showing a second example of the fixing jig;

FIG. 2-D is a fourth view similarly showing a second example of the fixing jig;

FIG. 3-A is a sectional view showing a first example of fixing a workpiece by a macromolecular freezing agent according to the present invention;

FIG. 3-B is a sectional view similarly showing a second embodiment of fixing the workpiece;

FIG. 3-C is a third view similarly showing a third embodiment of fixing the workpiece;

FIG. 3-D is a fourth view showing a fourth embodiment of fixing the workpiece;

FIG. 4-A is a sectional view showing a first example of fixing a workpiece by a macromolecular freezing agent when an allowable plate is used according to the present invention;

FIG. 4-B is a sectional view similarly showing a second example of fixing the workpiece;

FIG. 4-C is a third view similarly showing a third example of fixing the workpiece;

FIG. 5-A is a perspective view showing an example when an external preparatory cooling system is adopted according to the present invention;

FIG. 5-B is a perspective view similarly showing other example when the external preparatory cooling system is adopted;

FIG. 6-A is a sectional view showing a first example of a second embodiment of a freezing type workpiece, fixing method according to the present invention;

FIG. 6-B is a plane view thereof;

FIG. 7-A is a sectional view showing a second example of the second embodiment of a freezing type workpiece fixing method according to the present invention;

FIG. 7-B is a plane view thereof;

FIG. 8-A is a sectional view showing an example of a pallet fixing jig used in the freezing type workpiece fixing method illustrated by FIG. 6-A and FIG. 6-B;

FIG. 8-B is a sectional view showing an example of a pallet fixing jig used in the freezing type workpiece fixing method illustrated by FIG. 7-A and FIG. 7-B;

FIG. 9-A is a partially cut sectional view showing an example of a workpiece to which a third embodiment of a freezing type workpiece fixing method according to the present invention is applied;

FIG. 9-B is a sectional view showing a positional relationship between a workpiece and a fixing jig according to the third embodiment;

FIG. 9-C is a partially cut sectional view showing the third embodiment of the freezing type workpiece fixing method according to the present invention in a state before machining;

FIG. 10-A is a sectional view similarly showing an initial state of machining according to the third embodiment;

FIG. 10-B is a sectional view showing a state in which a first machining operation of a product is finished before proceeding to a next machining operation according to the third embodiment;

FIG. 11-A is a longitudinal sectional front view showing a first stage of the operation of FIG. 10-B;

FIG. 11-B is a longitudinal sectional front view similarly showing a second stage thereof;

FIG. 12-A is a side view showing other example of the third embodiment of a freezing type workpiece fixing method according to the present invention;

FIG. 12-B is a partially cut side view of a fixing jig used in the example;

FIG. 13 is a perspective view of a workpiece used in Embodiment 1;

FIG. 14-A is a perspective view showing a shape of a workpiece before machining according to Embodiment 3 of the present invention;

FIG. 14-B is a front view similarly showing dimensions of a workpiece according to Embodiment 3;

FIG. 14-C is a plane view similarly showing dimensions of the workpiece according to Embodiment 3;

FIG. 14-D is a perspective view similarly showing a state in which the workpiece has been finished machining according to Embodiment 3;

FIG. 14-E is a front view of a product according to Embodiment 3;

FIG. 15-A is a longitudinal sectional side view showing a state of machining the workpiece according to Embodiment 3 of the present invention;

FIG. 15-B is a front view similarly showing a state of machining the workpiece;

FIG. 16-A is a longitudinal sectional side view showing a state of machining a workpiece according to Embodiment 5;

FIG. 16-B is a partial sectional view showing a state in which the workpiece has been machined by magnifying the state; and FIG. 16-C is a magnified sectional view taken along an X—X line of FIG. 16-B.

DETAILED DESCRIPTION OF THE PREFERRED EMBODIMENTS

An explanation will be given of embodiments of the present invention in reference to the attached drawings as follows.

(Embodiment 1)

FIG. 1-A through FIG. 1-C show a first example through a third example of a first embodiment in which machining is carried out by applying the present invention. Numeral 1 designates a table of a working machine and numeral 2 designates a desired tool which is a grindstone in this example. Numeral 3 designates a workpiece fixing jig (hereinafter, simply referred to as fixing jig) and numeral 4 designates a jig fixing device for fixing the fixing jig 3 attachably and detachably which is mounted on the table 1 of the working machine. Numeral 5 designates workpiece (including either of a single and a plurality thereof) and numeral 6 designates a macromolecular freezing agent which is at least interposed between the workpiece 5 and the fixing jig 3. Numeral 7 designates fluid supplying means for freezing the macromolecular freezing agent. In this example, a fluid is utilized for machining the workpiece and the fluid supplying means includes a nozzle 70 for injecting or spraying a machining fluid into a machining region and a supplying device 71 for supplying the working fluid to the nozzle 70. In FIG. 1-B and FIG. 1-C, illustration of the supplying device 71 is omitted. When the machining fluid is a solution, as representatively shown by an imaginary line of FIG. 1-A, a cooling and pressurizing gas supplying device 72 may be connected to the system of the machining fluid via an adjust valve 720. Thereby, the machining fluid is supplied in a form of mist. FIG. 2-A through FIG. 2-D exemplify the fixing jigs 3 used in the present invention.

First, FIG. 1-A shows the first example. In this example, a vacuum chuck is used as the jig fixing device 4 and a suction pipe is connected to an outside vacuum pump 400.

The fixing jig 3 includes a main body 3a having a fixing face 30 that is brought into contact with the workpiece 5 and a base 3b installed on the lower face of the main body 3a. The main body 3a including the fixing face 30 is made of a material having excellent thermal conductivity, for example, copper, aluminum, alumina nitride or the like and the base 3b is made of an insulating material. As the insulating materials, plastics, ceramics or composites of these or the like are selectively used. Plastics include not only solid ones but foamed resins. Further, ceramics also include permeable ones.

The base 3b of the fixing jig 3 may cover a total of the lower side of the main body 3a as shown by FIG. 2-A or may include a window hole 31 such that a required range of the lower face of the main body 3a is exposed as shown by FIG. 2-B.

According to the first example, the fixing jig 3 is mounted on the jig fixing device 4 via the base 3b and the fixing jig 3 is fixed by operating the jig fixing device 4. Further, the workpiece 5 is mounted on the fixing face 30 of the main body 3a via the macromolecular freezing agent 6. In this stage, the fixing face 30 is maintained at a temperature higher than the freezing temperature of the macromolecular freezing agent 6. Under this state, a fluid at a temperature lower than the freezing temperature of the macromolecular freezing agent 6 is supplied from the fluid supplying means 7 to the workpiece 5 and the fixing jig 3 and under the state, the workpiece 5 is machined by the tool 2.

The macromolecular freezing agent 6 is instantaneously frozen by being cooled by the fluid by which a state where the workpiece 5 is solidly adhered to the fixing face 30 is brought about and the adhering state is maintained by continuously supplying the machining fluid during the machining operation.

FIG. 1-B shows the second example. According to the example, a magnetic chuck is used as the jig fixing device 4. According to the case of the jig fixing device 4, as the fixing jig 3, a structure in which a ferromagnetic plate 3c is laminated on the lower face of the base 3b comprising a material with excellent thermally insulating and electrically insulating performance is used as shown by FIG. 2-C.

According to the second example, the fixing jig 3 is mounted on the jig fixing device 4 via the ferromagnetic plate 3c, the fixing jig 3 is fixedly adsorbed by operating the jig fixing device 4 and the workpiece 5 is mounted on the fixing face 30 of the main body 3a via the macromolecular freezing agent 6. Further, a fluid at a temperature lower than the freezing temperature of the macromolecular freezing agent 6 is supplied from the fluid supplying means 7 to the workpiece 5 and the fixing jig 3 and under the state, the workpiece 5 is machined by the tool 2. The macromolecular freezing agent 6 is instantaneously frozen by being cooled by the fluid by which a state in which the workpiece 5 is solidly adhered to the fixing face 30 is brought about and the adhering state is maintained by continuously supplying the fluid during the machining operation.

FIG. 1-C shows the third example. According to the example, the fixing jig 3 includes the main body 3a having the fixing face 30 that is brought into contact with the workpiece 5 and the base 3b laminated on the lower face and in addition thereto, as shown by FIG. 2-D, the fixing jig 3 includes a passage 33 capable of circulating a cooling fluid at inside of the main body 3a and couplings, preferably quick connecting couplings 330' and 331' are attached to front ends of an introducing portion 330 and a discharging portion 331. The jig fixing device 4 comprises any of a vacuum chuck, a magnetic chuck and the like. Further, when the jig fixing device 4 is of a magnetic chuck, the base 3b is laminated with the ferromagnetic plate 3c as imaginarily illustrated.

According to the third example, the modes of fixing the workpiece the same as those in the first example and the second example may be adopted. In this case, the macromolecular freezing agent 6 is instantaneously frozen by being cooled by a fluid by which a state where the workpiece 5 is solidly adhered to the fixing face 30 is brought about and the adhering state is maintained by continuously supplying the fluid during the machining operation.

However, other method of use may be carried out in the third example since the fixing jig 3 per se includes the cooling means. That is, the macromolecular freezing agent 6 is interposed between the fixing face 30 of the fixing jig 3 and the workpiece 5. Under the state, the cooling fluid is previously circulated in the passage 33 of the fixing jig 3 at outside of the working machine by which the workpiece 5 is fixed by freezing the macromolecular freezing agent 6. Further, the fixing jig 3 fixed with the workpiece is fixedly mounted on the jig fixing device 4 and the machining fluid is supplied to the fixing jig 3 and the workpiece during the machining operation by which the freeze fixe state is maintained. A detailed explanation will be given again in respect of such a method of use shown below.

Here, a detailed explanation will be given of the feature of the present invention which is common to the first embodiment, a second embodiment and a third embodiment shown below. First, it is an indispensable physical property of the macromolecular freezing agent 6 used in the present invention that the freezing point of the macromolecular freezing agent 6 is higher than the freezing point of water and preferably, the macromolecular freezing agent 6 is frozen at temperatures which are equal to or higher than normal temperature. In addition thereto, the surface tension of the macromolecular freezing agent 6 is smaller than that of water thereby showing excellent water repellant performance. Further, the specific gravity of the macromolecular freezing agent 6 is preferably lighter than that of water and the macromolecular freezing agent 6 is provided with a physical property in which it can be washed off the workpiece after machining by a detergent of a kind used in a general household.

As the macromolecular freezing agent, silicone oil, particularly octamethylcyclotetrasiloxane represented by chemical symbol $Si_4C_8H_{24}O_4$ or agents having the compound as major component are pointed out. The silicone oil includes agents referred to as low molecular weight silicone oil, a tetramer of cyclic silicone oil, cyclic dimethyl siloxane, cyclic dimethyl silicone oil and so on.

Such a silicone oil or an agent including silicone oil as major component is provided with a property in which the freezing temperature is at least 10° C. and it freezes at temperatures near to normal temperature and is advantageous in view of excellent thermal stability, respective properties of chemical resistance, oxidation resistance and electrically insulating performance and in view of the fact that it is harmless to human body. Incidentally, although silicone oil includes silicone oil whose major component is a cyclic pentamer and silicone oil whose major component is a cyclic hexamer, the freezing points of these are lower than the freezing point of water and therefore, they are inappropriate as macromolecular freezing agents in the present invention.

The macromolecular freezing agent 6 is normally in a liquid state or a state near to the liquid state. In such a state, prior to machining, the macromolecular freezing agent 6 is coated on the fixing face 30 or the workpiece 5 or coated on both of the fixing face 30 and the workpiece 5. The film thickness is arbitrary and the sufficient fixing effect is achieved even with several micrometers of the film thickness.

When the macromolecular freezing agent 6 is coated, the fixing face 30 is maintained at a temperature higher than the freezing temperature of the macromolecular freezing agent. Under this state, the macromolecular freezing agent 6 in a liquid state is coated by an arbitrary method of by using a brush, a roller, spray or the like by which a film of the macromolecular freezing agent is formed on the fixing face 30. Next, the workpiece 5 is placed on the film of the macromolecular freezing agent, pertinently positioned, adjusted of orientation and so on. Thereafter, a fluid is injected to the workpiece 5 and/or the fixing jig 3 by which the temperature of the fixing face 30 is set to a temperature lower than the freezing point of the macromolecular freezing agent.

Thereby, the macromolecular freezing agent 6 is changed from a liquid state to a solid state and the workpiece 5 is solidly adhered to the fixing face 30 by frozen molecules of the frozen macromolecular freezing agent.

Incidentally, the "temperature lower than the freezing point" signifies a temperature whereby the frozen molecules of the macromolecular freezing agent are densely bonded and the fixing force (holding force) caused by the adhesion of the fixing face 30 and the workpiece 5 can sufficiently withstand a load by mechanical working and in the normal case, it is a temperature lower than the freezing point of the macromolecular freezing agent 6 by at least 3° C. or more, preferably, 5° C. or more.

Through the above-described procedure, the fixing state of the workpiece 5 is obtained and therefore, the working machine is operated and desired machining operation is performed on the workpiece 5 by the tool 2. In this case, a fluid exclusively for freezing the macromolecular freezing agent 6 or for machining is supplied to a portion where the tool 2 is brought into contact with the workpiece 5.

As a fluid for use, not only a fluid that is cooled down to an arbitrary temperature lower than the freezing temperature of the macromolecular freezing agent 6 but a liquid mixed with gas are pointed out. As the example, mist produced by adding and mixing cooled and pressurized air or gas with a temperature of 0° C. or lower and pressure of 5 through 7 $kg/cm^2$ to a liquid component is pointed out. When the mist is sprayed from the nozzle 70, heat of vaporization is dissipated in atomizing the liquid component and therefore, the cooling effect is further promoted and an effect equivalent to the cooling effect by a machining solution having an amount of about 10 l/minute or more which is used in the case of a generally use mechanical chuck process, can be achieved with a liquid amount as small as, for example, 2 l/minute or lower.

The frozen macromolecular freezing agent is provided with water repellency and therefore, even when a fluid at a temperature exceeding 0° C. is used as a machining fluid, the frozen macromolecular freezing agent is not melted, the frozen state is maintained and the workpiece 5 is firmly maintained in the fixed state. Accordingly, the functions by the machining liquid (cooling of heat of working, removal of machine chips or chipped-off abrasive grains, rust proof, lubrication between workpiece and tool) are sufficiently achieved and excellent state of machined face and accuracy can be obtained.

Further, even when the above-described liquid or mist is frozen to ice during the machining operation, ice does not freeze or laminate on the surface of the workpiece 5 because the frozen macromolecular freezing agent 6 is provided with water repellency and the tool 2 and portions attached thereto are maintained in a clean state without being destructed.

When machining as the object of operation has been finished in this way, supply of fluid from the fluid supplying means 7 is stopped. Then, the temperature of the fixing face 30 recovers to a temperature higher than the freezing point of macromolecular freezing agent whereby the macromolecular freezing agent 6 returns from the solid phase to the liquid phase and therefore, the fixing force exerted on the workpiece is released and the machined workpiece can be removed from the fixing face 30. Accordingly, the fixed state of the machined workpiece can be released and the workpiece can be taken out extremely simply and in a short period of time.

The macromolecular freezing agent 6 which has recovered to the liquid phase as mentioned above, may be flown away along with machine chips, chipped-off abrasive grains and the like by scraping the fixing face 30 pertinently by a scraper or the like. The machined workpiece is put into a water tank filled with, for example, water at a temperature higher than the freezing point of the macromolecular freezing agent 6 or a detergent of a kind widely used in households. Then, since the macromolecular freezing agent 6 is provided with the specific gravity lighter than that of water and is provided with no affinity in respect of water, the macromolecular freezing agent 6 is separated from water and floats up on the surface of water and the machine chips or chipped-off abrasive grains sink down to the bottom of the water tank and therefore, they can simply be separated. When water is blent with a detergent or the like, the macromolecular freezing agent 6 is separated from the workpiece further rapidly.

Then, when the macromolecular freezing agent 6 is put from the water tank into a recovery water tank storing water at a temperature lower than the freezing point of the macromolecular freezing agent 6, the macromolecular freezing agent 6 is frozen on water. Accordingly, they can be simply recovered by scooping it by a net or the like and can be reused. Accordingly, the macromolecular freezing agent 6 can be removed from the workpiece of the workpiece fixing means with extremely excellent operational performance and efficiency.

However, the state of the macromolecular freezing agent 6 according to the present invention is not limited to the liquid state or a state near to the liquid state. That is, it may be in a cream-like form or a paste-like form. In this case, in freezing, the agent becomes not a film but blocks having large volume whereby the workpiece 5 can fixedly be adhered firmly.

As the macromolecular freezing agent in a cream-like form or a paste-like form, silicone oil added and kneaded with solid particles is preferable. As solid particle, powder, particularly powder having a mean grain size of 10 $\mu$m or smaller, more preferably, fine powder with the mean grain size of 1 $\mu$m or smaller, further preferably, the mean diameter of 0.5 $\mu$m or smaller is used.

Although the material of the solid particles is not limited, generally, earth powder represented by diatomaceous earth, rice or wheat powders, starches, coral powders, wood ash, ash of burnt paper or fibres, white carbon, zeolite, fly ash and the like are pointed out as preferable examples. Other than these, ceramics, silicon, ferrite, carbon, graphite, glass, stone, gypsum, plastics, cotton, wood, pulp, paper, metals such as iron, copper, aluminum and so on or oxides of these and the like can also be used in powders.

Among the above-described solid particles, for example, diatomaceous earth, rice or wheat powders, starches can be recommended since they can be dispersed uniformly in silicone oil that is a base component because they comprise fine particles and are provided with low specific gravities, separation is difficult to cause and they are inexpensive. Several kinds of the solid particles may be used by mixing them. Further, in addition to the solid particles, a liquid substance for expediting separation from the workpiece in washing the workpiece after the machining operation, for example, a surfactant may be added by a very small amount along with the solid particles.

The solid particles not only increase the viscosity but function as aggregates in freezing the macromolecular freezing agent and the strength of the macromolecular freezing agent is increased substantially in proportion to the amount of adding the solid particles. Therefore, it is preferable to add the solid particles to silicone oil by at least 5 wt %. However, when the amount of addition is excessively large, the fluidity before freezing is deteriorated although the strength in the frozen state is increased and therefore, the agent is difficult to coat. Therefore, it is preferable that the upper limit is less than 50 wt %. Generally, a ratio of silicone oil to solid particle (powder) may be selected from a range of (9:1)–(5.1:4.9) and depending on the ratio of blending solid particles, the macromolecular freezing agent 6 is varied from a state near to the liquid state to a cream-like form or a paste-like form.

Such a macromolecular freezing agent in a cream-like form or a paste-like form is used on its own or together with the above-described macromolecular freezing agent in a liquid state. FIG. 3-A through FIG. 3-D show examples of this case. In these views, the macromolecular freezing agent in a liquid state is designated by notation 60 and the macromolecular freezing agent in a cream-like form or a paste-like form is designated by notation 600 to facilitate understanding. Incidentally, the examples illustrated by FIG. 3-A through FIG. 3-D are naturally selectively applicable to all of the above-described first embodiment, a second embodiment and a third embodiment, mentioned below.

In FIG. 3-A, the liquid macromolecular freezing agent 60 is interposed in a film-like shape between the lower face of the workpiece 5 and the fixing face 30, and the macromolecular freezing agent 600 in a cream-like form or a paste-like form is coated to connect side faces 51 of the workpiece 5 and portions of the fixing face 30 remote from the side faces 51 by predetermined distances. This embodiment is generally suitable in cutting, grinding or polishing a workpiece.

In FIG. 3-B, not only the macromolecular freezing agent 600 in a cream-like form or a paste-like form connects the side faces 51 of the workpiece 5 with portions of the fixing face 30 remote from the side faces 51 by predetermined distances but it is coated to cover an upper face 52 of the workpiece 5. This embodiment is generally suitable for cutting the workpiece thinly into slices. That is, when the workpiece is sliced, not only the areas of lower end faces of thin pieces of the workpiece are adhered to the fixing face 30 but they are held by the frozen macromolecular freezing agent where both end faces and an upper face are connected in a bridge-like shape.

In FIG. 3-C, the macromolecular freezing agent 600 in a cream-like form or a paste-like form is coated between the lower face of the workpiece 5 and the fixing face 30 and is coated to connect the side faces 51 of the workpiece 5 with portions of the fixing face 30 remote from the side faces 51 by predetermined distances. This embodiment is provided with an advantage of capable of omitting an allowance plate, mentioned later, since in the case of carrying out penetrative machining such as cutting or boring, the macromolecular freezing agent 600 between the lower face of the work piece 5 and the fixing face 30 functions as an allowance plate.

In FIG. 3-D, the macromolecular freezing agent 600 in a cream-like form or a paste-like form is coated between the lower face of the workpiece 5 and the fixing face 30 and between the side faces 51 of the workpiece 5 and portions of the fixing face 30 and coated to cover the upper face 52 of the workpiece 5 to envelop a total of the workpiece 5.

The macromolecular freezing agent 600 in cream-like form or a paste-like form is useful in preventing destruction by machining force by filling the gaps around a machined portion when a portion of the workpiece 5 such as represented by machining in respect of an E-type ferrite core, mentioned later, is machined.

Further, the macromolecular freezing agent 600 in a cream-like form or a paste-like form may arbitrarily be coated by a brush, a spatula or extruded by an extrusion gun.

As mentioned above, the workpiece 5 according to the present invention includes a workpiece laminated with an allowance plate. Details are shown by FIG. 4-A through FIG. 4-C. In these examples, a workpiece which is inherently an object of machining is designated by notation 5a and an allowance plate is designated by notation 5b. Generally, carbon or graphite plate is used for the allowance plate 5b having a hardness whereby machining operation by the tool 2 is not hampered.

The allowance plate 5b is supported by the fixing face 30 via the macromolecular freezing agent and the workpiece 5a as the inherent object of machining is supported on the allowance plate 5b via the macromolecular freezing agent. The allowance plate 5b is provided with an area equivalent to or more than that of the workpiece 5a.

FIG. 4-A shows an example where the high molecular freezing agent 60 in a liquid state is used. In FIG. 4-B, the macromolecular freezing agent 60 in a liquid state is interposed between the allowance plate 5b and the fixing face 30, the workpiece 5a is arranged on the allowance plate 5b via the macromolecular freezing agent 60 in a liquid state and further, the macromolecular freezing agent 600 in a cream-like form or a paste-like form connects the surroundings 51 of the workpiece 5a and the allowance plate 5b or the fixing face 30. In FIG. 4-C, the top face 52 of the workpiece 1a is further covered with the macromolecular freezing agent 600 in a cream-like form or a paste-like form and the agent is connected to the macromolecular freezing agent 600 in a cream-like form or a paste-like form at the surroundings 51 of the workpiece.

The present invention is not limited to a system of freezing and fixing the workpiece 5 by operating a fluid on the macromolecular freezing agent 6 when the machining of the workpiece 5 is started as described in the third example of the first embodiment but may adopt an outer preparatory cooling system. That is, the workpiece 5 may be mounted on the fixing jig 3 via the macromolecular freezing agent 6, the macromolecular freezing agent 6 may be frozen previously by cooling the fixing jig 3 at outside of the working machining 1 and the workpiece may be frozen and fixed. This system is preferable when workpieces are machined by successively exchanging them and attaching them to a working machine.

The freezing and fixing operation at outside of the working machine may be carried out by accommodating an assembly where the workpiece 5 is mounted on the fixing jig 3 via the macromolecular freezing agent 6 in a room or a tank filled with a fluid, for example, cold air at a temperature lower than the freezing temperature of the macromolecular freezing agent 6 or continuously transferring them in a tunnel-like passage.

Or, a precooler 8 may be used as shown by FIG. 5-A and the fixing jig 3 may be cooled by mounting the fixing jig 3 on the precooler 8. According to the present invention, the macromolecular freezing agent 6 having the freezing point higher than that of water is used as an adhesive medium and therefore, the precooler 8 having a low capacity is sufficient, and it is sufficient to use, for example, a core type one having a passage of fluid at inside thereof, connect it to a circulation type cooling device 8a and circulate a coolant, for example, water or the like or a coolant added with a cooling agent. In this case, the fixing jig 3 is preferably provided with the base 3b having the window hole 31 as shown by FIG. 2-B. The assembly is mounted on the precooler 8 by interposing an antifreezing agent between the lower face of the main body 3a and the cooling face of the precooler 8 as necessary, the workpiece 5 is mounted on the fixing jig 3 via the macromolecular freezing agent 6 in a later step or previously and the coolant is circulated and supplied from the circulation type cooling device 8a to the precooler 8. In this way, the workpiece 5 is brought into a state where it is frozen and fixed to the fixing jig 3 at outside of a working machine and therefore, in the machining operation, the fixing jig 3 is mounted on and fixed to the jig fixing device 4 and a fluid is supplied to the fixing jig 3 and the workpiece during the machining operation whereby the frozen and fixed state is maintained.

Further, in place thereof, the fixing jig 3 per se may be utilized as a precooler. That is, in this case, as the fixing jig 3 illustrated by FIG. 2-D, the passage 33 capable of circulating a cooling fluid at inside of the main body 3a, the couplings, preferably the quick connecting couplings 330' and 331' are attached to front ends of the introducing portion 330 and the discharging portion 331. In this case, as shown by FIG. 5-B, a supply tube and a return tube of the circulation type cooling device 8a are respectively provided at front ends thereof with quick connecting couplings 80' and 81' which are instantaneously attached to or detached from the introducing portion 330 and the discharging portion 331.

In this case, the quick connecting couplings 330' and 331' are connected to the quick connecting couplings 80' and 81', the workpiece 5 is mounted on the fixing jig 3 via the macromolecular freezing agent 6 by a mode selected from those in FIG. 3-A through FIG. 3-D and a coolant is circulated and supplied from the circulation type cooling device 8a to the fixing jig 3 by which the workpiece 5 is brought into a state where it is frozen and fixed to the fixing jig 3 without using a precooler. Thereafter, when connection between the quick connecting couplings 330' and 331' and the quick connecting couplings 80' and 81' of the circulation type cooling device 8a is released, the assembly functions as the fixing jig 3 and therefore, the fixing jig 3 is mounted on and fixed to the jig fixing device 4 as shown by FIG. 1-C and a machining fluid is supplied to the fixing jig 3 and the workpiece during the machining operation by which the frozen and fixed state is maintained.

Further, the operation or mode of use and the like of the macromolecular freezing agent 6 are the same as those in the above-described examples.

(Embodiment 2)

FIG. 6-A, FIG. 6-B, FIG. 7-A, FIG. 7-B, FIG. 8-A and FIG. 8-B show a second embodiment in which machining is carried out by applying a workpiece fixing method according to the present invention.

In the second embodiment, as a fixing jig 31 of the workpiece, a pallet 3a' in plate-like shape or having a surrounding wall at the surrounding which is made of a material having excellent thermal conductivity of copper, aluminum or the like is used. A base comprising an insulating material as illustrated by FIG. 2-A through FIG. 2-D or the like is not provided. Further, a jig fixing device 9 for fixing the pallet 3a' to the side of a working machine is mounted on the side of a table of the working machine 1.

FIG. 6-A and FIG. 6-B show a first example. Explaining in respect of example, as shown by FIG. 8-A, the jig fixing device 9 is provided with a main body 9a made of a material having excellent thermal conductivity such as copper, aluminum or the like and a base 9b comprising an insulating material integrated to the lower portion of the main body 9a and the base 9b is installed on the table of the working machine 1 by clamping means of a mechanical type, a vacuum type or a magnetic force type. Further, the main body 9a is provided with a fixing face 90 and is provided with means 9a' for fixing the pallet 3a' onto the fixing face 90. The fixing means 9a is arbitrary means of a vacuum type, a mechanical type, a magnetic force type or the like. In the illustration, a vacuum type is adopted, suction holes 900 are opened to the fixing face 90, the lower sides of the suction holes 900 reach outside of the fixing means 9a' and are connected to a vacuum pump 400 as shown by FIG. 6-A.

Further, in order to cool the pallet 3a' via the jig fixing device 9, a tank 9c in a trough-like shape having a predetermined depth is installed to surround the main body 9a of the jig fixing device 9. The tank 9c is fabricated by an insulating material of plastic or the like, a supply portion 91 for supplying a fluid for cooling is arranged at one side thereof and the supply portion 91 is connected to a fluid supplying device 71' of a circulation type as shown by FIG. 6-A or FIG. 7-A. A discharge portion 92 is provided on the other side. The discharge portion 92 is preferably connected to the fluid supplying device 71' via a return line and is circulated.

A fluid in this case may be a liquid such as water or cooled gas so far as the fluid is at a temperature lower than the freezing temperature of the macromolecular freezing agent 6. When a fluid for machining a workpiece is utilized, the fluid supplying device 71' may use a device for supplying a fluid for machining a workpiece.

Further, when the fixing means 9a' utilizes vacuum, the main body 9a and the pallet 3a' may use porous sintered bodies and in this case, they may use porous sintered bodies in which side faces in contact with a fluid for cooling are sealed or masked may be used.

According to the first example, the workpiece 5 is mounted on the pallet 3a' via the macromolecular freezing agent 6 at outside of the working machine 1. The macromolecular freezing agent 6 and the mode of use in this case have already been described and therefore, an explanation thereof will be omitted. The pallet 3a' is mounted on the jig fixing device 9 and the pallet 3a' is fixed by operating the fixing means 9a'.

A fluid for cooling is supplied from the fluid supplying device 71' under this state. Thereby, the fluid for cooling is sent from the supply portion 91 to the tank 9c and is discharged from the discharge portion 92 while being stored in the tank 9c. Thereby, the main body 9a of the jig fixing device 9 surrounded by the tank 9c is rapidly cooled since it is immersed with the fluid for cooling. Moreover, both of the main body 9a and the pallet 3a' are made of a material having excellent thermal conductivity and therefore, the pallet 3a' is also cooled by which the macromolecular freezing agent 6 is frozen and the workpiece 5 is adhered and fixed to the pallet 3a'.

The workpiece 5 is machined by the tool 2 under the state and during the machining operation, the pallet 3a' is cooled via the main body 9a by the fluid for cooling continuously supplied to the tank 9c and therefore, the frozen and fixed state of the macromolecular freezing agent 6 can firmly be maintained.

Accordingly, in the case of this example, although a dry type machining process where the machining fluid is not supplied to the portion for machining the workpiece is applicable, when the machining fluid is supplied to the portion for machining the workpiece, the pallet 3a' is cooled from above and therefore, the fixing force of the workpiece 5 is further intensified. The machining fluid supplied to the workpiece 5 is flown down to the tank 9c and is discharged along with the fluid for cooling.

Further, also in the second embodiment, similar to the first embodiment, the pallet 3a' may be cooled by the precooler 8 at outside of the working machine, the macromolecular freezing agent 6 may be frozen previously and the workpiece 5 may be adhered and fixed to the pallet 3a'. This operation is preferable in the case where the machining operation is carried out successively since other workpiece can be fixed to a next pallet during the machining operation in respect of one workpiece. That is, when the operation of the fixing means 9a' is released upon completion of the machining operation in respect of a certain workpiece 5, the pallet is instantaneously detached from the jig fixing device 9 and therefore, when the pallet 3a' to which a next workpiece 5 is frozen and fixed is mounted on the main body 9a and the fixing means 9a' is operated, the next machining operation can be carried out at once.

FIG. 7-A and FIG. 7-B show a second example. Although the second example is similar to the above-described first example, a difference therebetween resides in the system where the main body 9a of the jig fixing device 9 is cooled also from an inner portion.

That is, as shown by FIG. 8-B, the main body 9a of the jig fixing device 9 is provided with a passage hole 94 opened to inside of the tank 9c and an end portion of the passage hole 94 is connected to the fluid supplying device 71'. When the machining fluid is used as the fluid, the end portion may be connected to the fluid supplying device 71' of a circulation type or a portion of a supply line for supplying to the portion for machining the workpiece. The other constitution is the same as that in FIG. 6-A and FIG. 6-B and therefore, the explanation therefor is substituted and the same portions are attached with the same notations.

Also in the case of the second example, the workpiece 5 is mounted on the pallet 3a' via the macromolecular freezing agent 6 at outside of the working machine 1. The mode of use of the macromolecular freezing agent 6 in this case and the like are the same as those in the case of the above-described first embodiment. Next, the pallet 3a' is mounted on the jig fixing device 9 and the pallet 3a' is fixed by operating the fixing means 9a'.

The fluid for cooling is supplied from the fluid supplying device 71' under this state. Thereby, the fluid for cooling passes through the passage hole 94 of the main body 9a, flown into the tank 9c from the opening and is discharged from the discharge portion 92 to outside of the tank 9c while being stored in the tank 9c. Thereby, the main boy 9a and the pallet 3a' are effectively cooled by which the macromolecular freezing agent 6 is frozen and the workpiece 5 is adhered and fixed to the pallet 3a'.

When the fluid for cooling is continuously supplied from the fluid supplying device 71' while machining the workpiece 5 by the tool 2 under this state, the pallet 3a' is cooled and therefore, the adhered and fixed state of the macromolecular freezing agent 6 can firmly be maintained. Further, when the machining fluid is supplied to the portion of machining the workpiece, the pallet 3a' is cooled also from above and accordingly, the fixing force of the workpiece 5 can further be intensified.

Incidentally, also in the case of the second example, the macromolecular freezing agent 6 may be frozen previously by cooling the pallet 3a' by the precooler 8 at outside of the working machine 1 and the workpiece 5 may be adhered and fixed to the pallet 3a'.

(Embodiment 3)

The present invention is also applicable to a workpiece fixing process when the workpiece 5 is applied with a desired machining operation while rotating the workpiece 5. This is the process of the third embodiment. FIGS. 9-A, 9-B, 9-C, 10-A, 10-B, 11-A and 11-B show a first example thereof and FIG. 12-A and FIG. 12-B show a second example.

First, explaining in respect of the first example, the workpiece 5 is provided with a cylindrical shape as shown by FIG. 9-A and according to this example, ring-like products 5' are cut out at a constant pitch as cutting operation from the workpiece 5.

In this case, as shown by FIG. 9-C, the working machine 1 is provided with a main spindle 1c for rotation and the jig fixing device 4 of a collet type chuck or the like is installed at a front end of the main spindle 1c. The fixing jig 3 that is attachably and detachably fixed to the jig fixing device 4, is provided with a shaft portion 3d having a diameter smaller than an inner diameter of the workpiece 5 at a main body 3a made of a material having excellent thermal conductivity and a male screw in mesh with an attaching nut 3e is provided at a region of the shaft portion 3d on the side of a free end. The main body 3a is installed with a cover 3b' comprising an insulating material at a base portion fixed to the jig fixing device. The shaft portion 3d is provided with a hole in this example.

According to the embodiment, in the machining operation, an allowance member 5b in a cylindrical shape is prepared, the macromolecular freezing agent 6 is coated on the outer periphery of the shaft portion 3d or the inner periphery of the allowance member 5b or both of them, the allowance member 5b is fitted to the outer periphery of the shaft portion 3d, the macromolecular freezing agent 6 is coated on the outer periphery of the allowance member 5b or the inner periphery of the work piece 5 or both of them and the workpiece 5 is fitted to the outer periphery of the allowance member 5b as shown by FIG. 9-B. In this case, it is preferable to coat the macromolecular freezing agent 6 also on the end face of the main body 3a at the root of the shaft portion. Under this state, the attaching nut 3e is screwed with the shaft portion 3d. At this occasion, a clearance is provided between the end face of the attaching nut 3e and the end face of the workpiece 5 and the macromolecular freezing agent 6 is filled into the clearance. As have been already described, the state of the macromolecular freezing agent 6 is any of the liquid state, the cream-like form and the paste-like form. Carbon or the like having excellent thermal conductivity is used for the allowance member 5b as described above.

Further, under the state, for example, a nozzle is arranged on the side of the opening of the shaft portion 3d as fluid supplying means 700 for cooling and a fluid for cooling is continuously injected into the shaft portion 3d via the nozzle. The fluid for cooling is naturally at a temperature lower than the freezing temperature of the macromolecular freezing agent and may be a liquid or a gas different from those for machining the workpiece or may be a machining fluid for machining the workpiece.

Thereby, the shaft portion 3d, the allowance member 5b proximate thereto and the workpiece 5 proximate thereto are cooled by the fluid for cooling and accordingly, the macromolecular freezing agent 6 is instantaneously frozen by which the allowance member 5b, the workpiece 5 and the fixing jig 3 are adhered to each other integrally and solidly.

The fixing jig 3 fixed to the jig fixing device 4 is rotated by rotating the main spindle 1c under this state and the workpiece 5 fixed to the fixing jig 3 is integrally rotated and therefore, while feeding the tool 2, for example, a grindstone for cutting and cutting the workpiece 5 from the radius direction, the machining fluid (liquid, cooled gas or mixture of these) is supplied from the machining fluid supplying means 7 to the cutting region.

This is the state illustrated by FIG. 10-A and as mentioned above, the workpiece 5 is cut with excellent accuracy since the workpiece 5 is solidly adhered by freezing the macromolecular freezing agent.

When a first sheet of the product 5' is cut, as shown by FIG. 10-B, a groove is formed between the first sheet and the remaining portion of the workpiece 5 and the inner diameter side of the first sheet of the product 5' is held by the adhering force of the macromolecular freezing agent between the workpiece 5 and the allowance member 5b. Accordingly, by cutting the workpiece 5 after shifting the workpiece 5 in the axial direction, even when the workpiece 5 is made of a material which is difficult to cut such a ceramics or the like, the cutting operation can be performed with excellent efficiency and excellent accuracy.

However, depending on the groove C that is formed at every machining operation, since the product 5' is held independently in respect of the axial direction, in the case where the thickness of the product 5' is thin, the fixing force by the frozen macromolecular freezing agent on the inner diameter side is deficient, by the cutting operation of the tool 2 the product 5' may be fallen or may be chipped by being brought into contact with the tool 2, destruction or defect is caused and in the worst case, the product 5' is cut and scattered.

In such a case, during a time period where the cutting of the first product 5' has been finished and the tool 2 is being moved to a location remote from the groove C by the predetermined pitch, the macromolecular freezing agent 6 is filled in the groove C produced by the machining operation. FIG. 10-B shows such a state.

According to the method, as shown by FIG. 9-C and FIG. 10-B, a filling nozzle N that is movable in the axial direction is arranged at a location different from the location of the tool 2 and the macromolecular freezing agent 6 is supplied therefrom to the groove C produced by the machining operation by a method arbitrarily of injection or spraying. Thereby, the macromolecular freezing agent 6 is frozen by the operation of the fluid for cooling and constitutes a solid layer adhered to an end face of the product 5' and an end face of the workpiece 5. Accordingly, even when a successive cutting operation is carried out, a state where the product 5' is firmly fixed is maintained. That is, the respective cut products are integrated in a block form by the solid layers of the macromolecular freezing agent. Accordingly, a product of a thinned layer can be machined with extremely excellent accuracy.

In this case, when the both faces of the groove C, that is, the end face of the product and the end face of the workpiece are wetted by water included in the machining fluid, the adhering force of the macromolecular freezing agent 6 is deteriorated. Therefore, an air nozzle M is installed integrally with the filling nozzle N or at a vicinity thereof as necessary and by injecting air to the groove C by the air nozzle M as shown by FIG. 11-A, water drops on the end face of the product 5' and the end face of the workpiece 5 are wiped out and successively, the macromolecular freezing agent 6 is filled by the filling nozzle N.

Further, the fluid for cooling may be supplied not to the inner side of the shaft portion 3d but the outer side of the shaft portion 3d. In this case, the fluid for cooling may be supplied to the end face of the main body 3a or the length of the shaft portion 3d may be prolonged pertinently in the forward direction from the position of attaching the attaching nut 3e and the fluid for cooling may be supplied to the prolonged portion.

Next, FIG. 12-A and FIG. 12-B show a second example of a workpiece fixing process when the workpiece 5 is machined while being rotated.

In the second example, the workpiece 5 is not formed in a cylindrical shape but a plate-like shape or a block shape. The fixing jig 3 is provided with fins 3f for cooling at the shaft portion 3d extended from the main body 3a having excellent thermal conductivity and is provided with the fixing face 30 in a recessed shape for mounting the workpiece 5 at the front end portion of the shaft portion 3d. A cover 3b' having insulating performance is attached to the main body 3a.

Further, a nozzle is arranged outside of the shaft portion 3d as the supplying means 700 for supplying a fluid for cooling from which fluid or cooled gas is continuously supplied to the fins 3f. The other constitution is the same as that of the first example and accordingly, the same portions are attached with the same notations and an explanation thereof will be omitted.

In the machining operation, the workpiece 5 is mounted on the fixing face 30 in a recessed shape of the shaft portion 3d via the macromolecular freezing agent 6 in a liquid state or a cream-like form or a paste-like form. When the macromolecular freezing agent 6 in a cream-like form or a paste-like form is used, the mode is selected from those of FIG. 3-A through FIG. 3-D. Further, liquid or cooled gas is supplied from the supplying means 700 for supplying a fluid for cooling to the shaft portion 3d. The liquid or the cooled gas may be the same as the machining fluid for the workpiece 5 or may be different therefrom. The macromolecular freezing agent 6 is instantaneously frozen by being cooled from the shaft portion 3d by which the workpiece 5 is solidly adhered and fixed to the fixing face 30.

Then, similar to the first example, the machining fluid is supplied to the machining region while feeding a desired one of the tool 2, for example, a bit, a polishing tool or the like and liquid or cooled gas is supplied continuously from the supplying means 700 for supplying a fluid for cooling to the outer periphery of the shaft portion 3d. Thereby, the workpiece 5 is machined at high speed and with excellent surface roughness.

Further, both in the second example and the first example, not only the workpiece 5 is frozen and fixed in a state where the fixing jig 3 is attached directly to the working machine 1 but the fixing jig 3 may be removed from the jig fixing device 4, attached to the above-described precooler previously at outside of the working machine and the macromolecular freezing agent 6 may be frozen by being cooled by the precooler after mounting the workpiece 5 onto the fixing jig 3 via the macromolecular freezing agent 6 whereby the workpiece 5 may be adhered and fixed.

Incidentally, the above-described embodiments are only examples of the present invention, the present invention is not limited thereto but, for example, supply of the fluid for cooling or the machining fluid may be carried out through the inside of the tool 2.

EXAMPLES

Next, examples of the present invention will be shown.

Example 1

As a macromolecular freezing agent, low molecular weight silicone oil of cyclic polymethyl siloxane having characteristics, shown below, was used.

The low molecular weight silicone oil was a colorless transparent liquid of viscosity (at 25° C.) 2.4 cSt (m$^2$/S), freezing point 17° C., refractive index (at 25° C.) 1.394, surface tension 19.0 {1.90}dyn/cm{MN/cm} and specific gravity (at 25° C.) 0.95.

When the adhesive force of the macromolecular freezing agent was preliminarily tested, the adhesive force was found to be 11 through 15 kg/cm$^2$ in the vertical direction and 8 through 12 kg/cm$^2$ in the shear direction under conditions where the temperature of the fixing face and the workpiece was 5° C. and the material of the main body of the fixing jig was copper and the material of the workpiece was a superalloy.

1) Using the above-described macromolecular freezing agent and using the vacuum chuck as shown by FIG. 1-A as the jig fixing device, a microwave dielectric ceramic element was sliced.

2) A fixing jig as illustrated by FIG. 2-A was used. Dimensions of the fixing face was 300×150 mm.

3) The material of the workpiece was PZT barium titanate and dimension thereof were 50 (W)×50 (L)×2 (t) mmin accordance with the designation of FIG. 13-A and the workpiece was machined into dimensions of 5(W)×5(L)×2 (t) mm.

A slicing machine was used as a machine tool and the machining conditions were, tool; resinoid bond diamond grindstone (grade #600), tool dimensions; outer diameter 100 mm, thickness 0.4 mm, feed rate of tool 500 mm/min, tool rotational number; 5000 rpm and machining direction; down cut.

4) Prior to machining, a vacuum pump was operated, a fixing jig was fixedly adsorbed to the jig fixing device, temperature of the fixing face of the fixing jig was maintained at about 20° C., the macromolecular freezing agent was coated on the fixing face by a thickness of about 2 μm under the state and the workpiece was placed thereon. In machining, a machining solution of an emulsion type formed by blending a surfactant, a mineral oil and water which was cooled at about 5° C. was used as the machining fluid, a needle nozzle having a diameter of 1 mm was used as the supplying means for supplying the machining fluid and the machining fluid was directly injected therefrom from the forward direction in the direction of advancing the tool to the machining portion where the workpiece and the tool were brought into contact with each other at a rate of about 150 cc/min.

6) As a result, the macromolecular freezing agent was instantaneously frozen and the workpiece was firmly adhered and fixed to the fixing face of the fixing jig. When the machining operation was carried out while continuing to supply the machining fluid, the macromolecular freezing agent was not melted, the workpiece was maintained in a stable fixed state, no crack or chipping was caused on the sliced cut face and excellent shear face was obtained.

After the machining operation, supply of the machining fluid was stopped, the operation of the jig fixing device was released and the fixing jig was detached from the machine tool. Also in this case, the workpiece was fixed on the fixing face of the fixing jig and when the temperature of the fixing face was elevated to 20° C. after elapse of about 1 minute, the macromolecular freezing agent was recovered to a liquid state and fixing of the finished workpiece was released.

The macromolecular freezing agent, the machine chips and the chipped-off abrasive grains were flown down from the fixing jig and charged into a water tank where water temperature was maintained at 20° C. Thereby, the macromolecular freezing agent was separated and floated up and when the macromolecular freezing agent was injected into a contiguous water tank where water temperature was maintained at 10° C., the macromolecular freezing agent was frozen and almost a total thereof was recovered.

7) The above-described machining operation was carried out by the conventional process for comparison. In this case, water was sprayed on the fixing face of a freezing type chuck device, the workpiece was placed thereon, plus current was conducted to a thermoelement of the freezing type chuck device whereby the temperature of the fixing face was lowered to $-10°$ C. and temperature was maintained during the machining operation. Thereby, water was frozen and the workpiece was fixed.

In starting the machining operation, when a polishing solution was injected under the above-described conditions, ice was melted and the fixed state of an object to be machined was released and the machining operation could not be carried out. Hence, air mist including moisture of about 5% was injected to a portion of the workpiece which was displaced from the portion to be cut at pressure of 5 $kg/cm^2$ and air cooled down to about $-10°$ C. was directly injected to the portion to be cut. Thereby, although ice was not melted, crack caused by polishing heat occurred on the lower side of the cut face of the sliced workpiece and when the crack was scratched by a finger nail, the cut face was flaked off whereby a failed product was made.

Example 2

1) A composite material made of aluminum and plastic was cut.

The material was a composite of aluminum A2011 and epoxy resin, dimensions were 300 (W)×200(L)×2(t) mm for upper and lower aluminum sheets, 300(W)×200(L)×0.1(t) mm for a middle plastic sheet and dimensions after machining were 300(W)×6(L)×4.1(t) mm.

The machine tool was a precision slicing machine, the used tool was a circular disk having a diameter of 100 mm attached with 3 of diamond tools having the length of 10 mm and the thickness of 1 mm, the tool rotational speed was 6000 rpm, feed rate of the tool was 120 mm/min and the machining direction was in the down cut direction.

As the macromolecular freezing agent, a liquid silicone oil of viscosity (at 25° C.) 2.5 $cSt(m^2/S)$, freezing point 10° C., refractive index (at 25° C.) 1.394, surface tension 19.0 {1.90}dyn/cm{MN/cm} and specific gravity (at 25° C.) 0.95 was used. The fixing jig as shown by FIG. 2-B was used and a vacuum chuck was used for the jig fixing device. The fixing jig was cooled for fixing the workpiece by a precooler of a circulation type for circulating water at outside of the machine tool.

2) In machining, warm water at 20° C. was supplied from a circulation type fluid supplying device to the core of the precooler, the macromolecular freezing agent was coated on the fixing face of the fixing jig by a thickness of about 2 μm under the state, the workpiece was placed thereon, successively, the liquid circuit was switched, cold water was supplied from the circulation type cooling device to the core, the temperature of the fixing face was lowered to 20° C. and the state was maintained. Thereby, the macromolecular freezing agent was frozen and the workpiece was adhered and fixed.

3) In this way, the fixing jig previously fixed with the workpiece was mounted on a vacuum chuck and was mechanically fixed by operating a vacuum pump.

As a machining fluid, a mixture of a coolant solution cooled down to about $-10°$ C. and cool air cooled down to about $-10°$ C. by a ratio of 1:56 was used and the machining solution was injected directly from the forward direction in the direction of advancing the tool to the machining point at about 1.3 l/min and about 5 $kg/cm^2$.

4) As a result, the state of fixing the workpiece by the macromolecular freezing agent was stably maintained, the plastic material sandwiched at the middle of the workpiece was not melted at all and the cut face of the workpiece was a mirror-finish face having the surface roughness of 0.2 s or smaller. Further, the motion of the tool was smooth and the dimensional accuracy of the cut product was excellent.

Example 3

1) Polishing of a gap of an E-type ferrite core with a thin middle leg was carried out.

The workpiece was in a shape as shown by FIG. 14-A, and the dimensions were, according to designation of FIG. 14-B and FIG. 14-C, height h of 8 mm, overall width W of 15 mm, width of left or right leg $W_1$ of 2 mm, thickness $t_1$ of 3 mm, width $W_2$ of middle leg of 7 mm and thickness $t_2$ of 0.6 mm. The middle leg of the workpiece was cut by 0.4 mm from height h of 8 mm to form a gap g thereby forming a product having a shape shown by FIG. 14-D and FIG. 14-E.

2) A surface grinder with a creep function was used as a machine tool, a resinoid bond diamond grindstone (grade #400) having a diameter of 200 mmφ was used for a tool and machining conditions were rotational speed of grindstone; 2700 rpm, feed rate of grindstone; 600 mm/min and mode of machining; creeping and down cut.

2) The macromolecular freezing agent as in Example 1 was used and the fixing jig as shown by FIG. 2-B was used. A vacuum chuck was used for the jig fixing device.

3) In the machining operation, the temperature of the fixing face of the fixing jig was maintained at about 20° C., the macromolecular freezing agent in Example 1 was coated on the fixing face by a thickness of about 3 μm under the state on top of which 20 units of the workpieces were aligned in contact with each other as schematically shown by FIG. 15-A and further, the gaps between the legs on the both sides and the middle legs were filled with the macromolecular freezing agent in a paste-like form produced by adding and kneading 30 wt % of diatomaceous earth having the mean grade size of 0.01 μm to low molecular silicone oil of Example 1.

4) In machining, two of needle nozzles having the diameter of 1 mm were used as the supplying means for supplying the machining fluid and from these a polishing fluid cooled down to about 3° C. was directly injected to the polishing point from the forward direction in the direction of advancing the grindstone at about 150 cc/min. FIG. 15-B schematically shows the machining state.

5) As a result, the macromolecular freezing agent was instantaneously frozen by which the workpiece was adhered and fixed, the gaps between the legs on the both sides and the middle legs were filled with the frozen macromolecular freezing agent in a paste-like form and the middle legs were reinforced. During the machining operation, the workpiece was maintained in a stable fixed state. Further, the macromolecular freezing agent filling the gaps between the middle legs and the legs on the both sides did not melt whereby a state where the thin middle legs were firmly reinforced was maintained, the thin middle legs sufficiently withstood the machining resistance when the middle legs were cut by the grindstone and the gap machining was carried out with excellent accuracy and with no destruction of a total of the units.

6) Similar to Examples 1 and 2, for comparison, the workpiece was fixed to the fixing face by freezing of ice, the gaps between the legs on the both sides and the middle legs were filled with ice and the gap machining was carried out under the above-described conditions. However, in this case, ice was melted by the machining solution during the machining operation, the middle legs were broken and further, the workpiece per se was released from the fixed state whereby the machining operation could not be carried out.

Example 4

1) Cutting was carried out by using a pallet as the fixing jig.

The macromolecular freezing agent as described in Example 1 was used. The pallet made of material of an aluminum alloy having dimensions of 120 (W)×130 (L)×10 (t) mm was used.

The jig fixing device shown by FIG. 8-A having a vacuum chuck and a tank made of plastic was used and was firmly installed on a table of a machine tool via a base made of plastic at the lower portion of the machine. A precooler of a cooling water circulation type having a cooling plate with dimensions of 100(W)×110(L)×50(t) mm was used.

A workpiece having the material of PZT barium titanate and dimensions of 50(W)×50(L)×1(t) was used.

2) In respect of machining steps, a temperature at the upper face of the cooling plate of the precooler was maintained at 4° C. on standby. The macromolecular freezing agent was coated on the pallet which was maintained at normal temperature by a thickness of about 2 $\mu$m and the workpiece was mounted on the pallet. The pallet was mounted on the precooler under the state. Thereby, the macromolecular freezing agent was frozen and each workpiece was brought into a state of being solidly adhered and fixed.

The pallet was mounted on the jig fixing device and a vacuum pump was operated by which the pallet was fixed mechanically on the fixing face.

A water-soluble machining fluid (including antifreezing solution) which was cooled down to about 5° C. was used as a cooling fluid for the pallet and supplied from a circulation type supplying device into the tank at a rate of 1000 cc/min and the amount of discharging water was controlled such that the water level was disposed at about a half of the height level of the main body. As a machining fluid for the workpiece, a water-soluble machining fluid (including antifreezing solution) which was cooled down to about 5° C. was directly injected to the machining point from forward from the tool by using a needle nozzle having the diameter of 4 mm at a rate of 150 cc/min.

3) The workpiece was maintained in a state where it was solidly fixed to the pallet by supplying the water-soluble fluid to the tank and the pallet was cooled from the upper face by the machining fluid injected to the workpiece and owing to the synergic effect, the workpiece was maintained in a state where it was firmly fixed even at the machining speed of 50 mm/min, the cut face was provided with no chipping and a very clean cut face was obtained.

3) Meanwhile, during the above-described machining operation, a workpiece of a next lot was arranged on a pallet under the above-described condition, the pallet was mounted on the precooler at the above-described temperature and was fixed by freezing the macromolecular freezing agent.

Further, simultaneously with finishing of the machining operation, the adsorbed and fixed state of the jig fixing device was released, the pallet fixed with the machined workpiece was removed, the pallet which had been mounted on the precooler was mounted on the jig fixing device and adsorbed and fixed. Thereby, the operation immediately shifted to a next machining step.

4) According to the embodiment, attachment and detachment of the workpiece to and from the machine tool was carried out in an extremely short period of time of 10 seconds. Further, even when the pallet was removed from the jig fixing device, the temperature at that time was lower than the freezing temperature of the macromolecular freezing agent and therefore, the workpiece was integrated with the pallet and the handling was facilitated. As postprocessings, the machined workpiece was charged into a water tank storing warm water at 20° C. while being fixed to the pallet. Thereby, the workpiece was cleaned and the macromolecular freezing agent was separated and floated up and the macromolecular freezing agent was transferred to a water tank storing water at 10° C. Thereby, the macromolecular freezing agent was frozen and could be recovered smoothly.

Example 5

1) A samarium cobalt material having dimensions of 50(L)×25(W)×7(t) mm was sliced into 50(L)×1.5(W)×7(t) mm by a multiple cutting grindstone.

A slicing machine was used for the machine tool and a multiple grindstone comprising 10 sheets of electrodeposited diamond grindstones (grade #280) with tool dimensions of outer diameter 100 mm, thickness 0.4 mm and pitch of grindstone of 2 mm was used for the tool. The machining conditions were rotational number of grindstone of 3000 rpm, feed rate of tool of 20 mm/min and direction of machining of down cut.

2) A pallet was used as the fixing jig and the same jig fixing device as used in Example 4 was used under the same conditions and the precooler and its conditions of use were the same as those in Example 4.

However, according to Example 5, as shown by FIG. 16-A, the macromolecular freezing agent in a liquid state of Example 1 was coated on the pallet on which an allowance plate comprising carbon having a thickness of 5 mm was arranged, the macromolecular freezing agent in a paste-like form was coated on the allowance plate by about 0.1 mm on which the workpiece was placed and further, the macromolecular freezing agent in a paste-like form was coated on side faces and an upper face of the workpiece.

As the macromolecular freezing agent in a paste-like form, an agent (first type) produced by adding 30 wt % of diatomaceous earth having the mean grain size of 0.01 μm to the low molecular weight silicone oil in Example 1 and kneading the mixture and an agent (second type) produced by adding 35 wt % of wheat powder to the low molecular weight silicone coil of Example 1 and kneading the mixture were respectively used.

3) The pallet was mounted on the precooler under the state, the temperature at the fixing face was lowered to 3° C. and the state was maintained. Thereby, the macromolecular freezing agent was frozen and the workpiece was adhered and fixed in a state where it was enveloped by the macromolecular freezing agent.

A water-soluble machining fluid (including antifreezing solution) which was cooled down to about 3° C. was used as the cooling fluid for the pallet, the fluid was supplied from a circulation type supplying device into a tank at a rate of 1000 cc/min and the amount of discharging water was controlled such that the water level was disposed at about a half of the height level of the main body. As the workpiece machining fluid, a polishing solution which was cooled down to about 3° C. was directly injected to the machining portion where the workpiece was brought into contact with the tool at a flow rate of about 15 l/min.

4) As a result, both in cases where both the first type and the second type of the macromolecular freezing agents were used, the workpiece was cut to a thickness as thin as 1.5 mm (designated by notation 5' in FIG. 16-B) in the slicing operation and yet, no pieces were broken off and scattered from the fixing face and a stable fixed state was maintained.

When for comparison, the workpiece was fixed and machined by using only the macromolecular freezing agent in a liquid state of Example 1, about 5% of the workpieces had been scraped off and scattered from the fixing face during the machining operation.

It seems that excellent result was obtained according to the example since the strength of the adhering layer was increased by the macromolecular freezing agent in a paste-like form blent with the fine powders, the adhering layer having a large volume comprising the frozen macromolecular freezing agent was adhered to the fixing face while supporting both end portions in the longitudinal direction of the workpiece which was being sliced or which had been sliced as shown by FIG. 16-B and FIG. 16-C and further, the adhering layers at both end portions in the longitudinal direction were connected to the upper layer of the frozen macromolecular freezing agent on the upper face of the workpiece thereby forming a bridge.

Example 6

1) A machining operation of cutting out a product having a donut-like shape with dimensions of outer diameter 60 mm, inner diameter 45 mm and thickness 0.5 mm from a ceramic cylinder having a material of PZT and dimensions of length 70 mm, outer diameter 60 mm and inner diameter 45 mm was carried out according to the present invention.

A structure shown by FIG. 9-B was used for the fixing jig. That is, the fixing jig where the main body made of aluminum with its outer portion covered with plastic was provided with a shaft portion having outer diameter 40 mm and inner diameter 23 mm, was used. Further, the macromolecular freezing agent in a liquid state of Example 1 was coated on the outer periphery of the shaft portion, a cylindrical allowance member comprising carbon having a thickness of 2.3 mm was externally fitted onto the outer periphery of the shaft portion, the macromolecular freezing agent in a paste-like form of the second type of Example 5 was coated by about 0.1 mm and the ceramic cylinder as the workpiece was externally fitted onto the outer periphery of the allowance member. The macromolecular freezing agent in a paste-like form was coated on the both end faces of the ceramic cylinder in the axial direction and the both end faces of the ceramic cylinder were brought into close contact with the end face of the main body and the end face of the attaching nut.

2) A slicer was used as the machine tool and the main body of the fixing jig was fixed to a chuck at the end of a main spindle. As a tool, an electro-deposited diamond grindstone (grade #280) having tool dimensions of outer diameter 100 mm and thickness 0.4 mm was used. The machining conditions were rotational number of grindstone; 3000 rpm, feed rate of tool; 10 mm/min and rotational number of workpiece; 20 rpm.

In the machining operation, a nozzle was inserted from the side of an opening of the shaft portion of the fixing jig and water at 3° C. was continuously injected therefrom at a rate of 1000 cc/min. Thereby, the macromolecular freezing agent was frozen and the ceramic cylinder, the allowance member and the main body of the fixing jig were integrated by adhesion.

3) While continuing injection of water from the nozzle, the main spindle was rotated at 20 rpm, a polishing fluid which was cooled down to about 3° C. was supplied to the tool and the cut portion at a flow rate of about 15 l/min thereby carrying out the cutting operation. Further, during a time period where a product had been cut and the tool was being moved to a successive pitch, air is injected from a nozzle having a wide width to the cut end face of the ceramic cylinder and into a groove between products and also the macromolecular freezing agent in a liquid state of Example 1 was injected from a nozzle having a wide width. Thereby, the cut end faces of the ceramic cylinder and the groove among products were filled with the macromolecular freezing agent and the agent was instantaneously frozen into blocks by being cooled by water injected to the cylindrical portion of the fixing jig.

By repeating these steps, the above-described product having a clean machined face was efficiently machined with no trouble of chipping or the like.

Example 7

1) The present invention was applied to a machining operation where a curved face was formed by cutting a material for a plastic lens having diameter 10 mm and thickness 2 mm by turning a lathe.

A structure shown by FIG. 12-B was used for the fixing jig. That is, a main body having the diameter of 20 mm and a material comprising aluminum was provided with a shaft portion of 20 mm having fins, a projected base portion having the thickness of 3 mm was formed at the front end of the shaft portion and a fixing face having the depth of about 1 mm and a recessed shape was formed at the projected base portion. The fixing jig was mounted to a precooler outside of the machine tool, the macromolecular freezing agent of Example 1 was coated on the fixing face in a recessed form, the material for a plastic lens was mounted on the fixing face, cold water was supplied from a circulation type cooling device to the core by which the temperature of the fixing face was lowered to 2° C. and the state was maintained.

Thereby, the macromolecular freezing agent was frozen and the workpiece was fixed unmovably.

2) A high speed lathe was used with machining conditions of rotational number of main spindle; 8000 rpm, bit for use; natural diamond chip, depth of cut; $1/100$ mm, feed rate of bit; 10 mm/min and machining allowance; 0.1 mm at maximum.

In the machining operation, the fixing jig which had previously been cooled was attached to the main spindle, while rotating the spindle, cooled air which was cooled down to −30° C. was continuously injected from a nozzle to the shaft portion of the fixing jig and the cooled air was injected to the front end of the bit thereby carrying out the cutting operation.

As a result, the material for a plastic lens was not detached at all and the material could be machined to an extremely excellent face roughness.

What is claimed is:

1. A freezing type workpiece fixing method which is a method of fixing a workpiece for carrying out a mechanical working, said method comprising the steps of interposing a macromolecular freezing agent having a freezing point higher than the freezing point of water at least between the workpiece and a surface of a fixing jig and cooling and freezing the macromolecular freezing agent by operating a fluid at a temperature lower than the freezing temperature of the macromolecular freezing agent during a time period of machining the workpiece in a state where the macromolecular freezing agent is interposed between the workpiece and the surface of the fixing jig to thereby adhere and fix the workpiece.

2. The freezing type workpiece fixing method according to claim 1, wherein the fixing jig having a main body having excellent thermal conductivity with a surface thereof constituting a fixing face and a base comprising a thermally insulating material is used, the fixing jig is fixed to a jig fixing device on a side of a working machine, the macromolecular freezing agent is interposed at least between the fixing face of the fixing jig and the workpiece and a fluid is supplied at least to a workpiece machining region to thereby cool simultaneously the surface of the fixing jig.

3. The freezing type workpiece fixing method according to claim 1, wherein the fixing jig having a main body having excellent thermal conductivity with a surface thereof constituting a fixing face and a base comprising a thermally insulating material, is used, the workpiece is adhered and cooled by freezing the macromolecular freezing agent by cooling the fixing jig in which the macromolecular freezing agent is interposed at least between a fixing face and the workpiece previously at outside of a working machine, the fixing jig to which the workpiece has been fixed is fixed to a jig fixing device on a side of the working machine and the fluid is supplied at least to a workpiece machining region to thereby cool the surface of the fixing jig.

4. The freezing type workpiece fixing method according to claim 3, wherein the main body of the fixing jig includes a passage of a cooling medium at an inner portion thereof and the macromolecular freezing agent is frozen by flowing the cooling medium through the passage to thereby fix the workpiece.

5. The freezing type workpiece fixing method according to claim 1, wherein a pallet having an excellent thermal conductivity is used as the fixing jig, a jig fixing device having a main body having an excellent thermal conductivity and fixing means capable of fixing attachably and detachably the pallet and a tank surrounding the main body is installed on a side of a working machine, the pallet is fixed to the main body by the fixing means, the macromolecular freezing agent is interposed at least between the pallet and the workpiece and the pallet is cooled by cooling the jig fixing device by supplying the fluid at the temperature lower than the freezing temperature of the macromolecular freezing agent into the tank to thereby freeze the macromolecular freezing agent.

6. The freezing type workpiece fixing method according to claim 1, wherein a pallet having an excellent thermal conductivity is used as the fixing jig, a jig fixing device having a main body having an excellent thermal conductivity and fixing means capable of fixing attachably and detachably the pallet and a tank surrounding the main body is installed on a side of a working machine, the macromolecular freezing agent is interposed at least between the workpiece and the pallet, the workpiece is adhered and fixed to the pallet by freezing the macromolecular freezing agent by previously cooling the pallet at outside of the working machine, the pallet to which the workpiece has been fixed is fixed to the jig fixing device by the fixing means and while the pallet is fixed, the pallet is cooled by cooling a pallet fixing jig by supplying the fluid at the temperature lower than the freezing temperature of the macromolecular freezing agent into the tank.

7. The freezing type workpiece fixing method according to claim 5, wherein the fluid at the temperature lower than the freezing temperature of the macromolecular freezing agent is supplied into the tank via an inner portion of the main body of the jig fixing device.

8. The freezing type workpiece fixing method according to claim 1, wherein the fixing jig having a main body comprising a material having an excellent thermal conductivity and a shaft portion extended outwardly from the main body is used, the workpiece is attached to the shaft portion via the macromolecular freezing agent and the fluid at the temperature lower than the freezing temperature of the macromolecular freezing agent is operated to the shaft portion continuously during a time period of machining the workpiece to thereby adhere and fix the workpiece by freezing the macromolecular freezing agent.

9. The freezing type workpiece fixing method according to claim 8, wherein the shaft portion is hollow.

10. The freezing type workpiece fixing method according to claim 8, wherein the workpiece is cylindrical and is fitted to an outer periphery of the shaft portion.

11. The freezing type workpiece fixing method according to claim 8, wherein the shaft portion includes a fixing face at a font end thereof and the workpiece is attached to the fixing face.

12. The freezing type workpiece fixing method according to claim 1, wherein a machining fluid is used as the fluid at the temperature lower than the freezing temperature of the macromolecular freezing agent.

13. The freezing type workpiece fixing method according to claim 1, wherein a fluid different from a machining fluid is used as the fluid at the temperature lower than the freezing temperature of the macromolecular freezing agent.

14. The freezing type workpiece fixing method according to claim 1, wherein the macromolecular freezing agent is silicone oil or a liquid substance having a major component of silicone oil.

15. The freezing type workpiece fixing method according to claim 1, wherein the macromolecular freezing agent is either of a substance in a cream-like form and a substance in a paste-like form produced by adding solid particles to silicone oil or a liquid substance having a major component of silicone oil and mixing silicone oil or the liquid substance having the major component of silicone oil and the solid particles.

16. The freezing type workpiece fixing method according to claim 1, wherein both of silicone oil or a liquid substance having a major component of silicone oil and either of a substance in a cream-like form and a substance in a paste-like form produced by adding solid particles to silicone oil or the liquid substance having the major component of silicone oil and mixing silicone oil or the liquid substance having the major component of silicone oil and solid particles are used as the macromolecular freezing agent.

17. The freezing type workpiece fixing method according to claim 15, wherein either of the substance in a cream-like form and the substance in a paste-like form is coated such that a portion or a total of a surrounding of the workpiece is connected to a fixing face.

18. The freezing type workpiece fixing method according to claim 16, wherein either of the substance in a cream-like form and the substance in a paste-like form is coated such that a portion or a total of a surrounding of the workpiece is connected to a fixing face.

19. The freezing type workpiece fixing method according to claim 14, wherein silicone oil is octamethylcyclotetrasiloxane having a freezing temperature equal to or higher than 10° C.

20. The freezing type workpiece fixing method according to claim 15, wherein silicone oil or the liquid substance having the major component of silicone oil is octamethylcyclotetrasiloxane having a freezing temperature equal to or higher than 10° C., the solid particles are powders having a mean grain size equal to or lower than 10 $\mu$m and are added to the liquid substance by 5 wt % or higher.

21. A freezing type workpiece fixing method which is a method of fixing a workpiece for mechanically working the workpiece, said method comprising the steps of interposing silicone oil in a liquid state or either of a substance in a cream-like form and a substance in a paste-like form produced by adding solid particles to the silicone oil and mixing silicone oil and the solid particles at least between the workpiece and a surface of a fixing jig, operating a machining fluid at a temperature lower than a freezing temperature of either of the liquid substance, the cream-like substance and the paste-like substance to the workpiece and the fixing jig during a time period of machining the workpiece by a tool in a state where either of the liquid substance, the cream-like substance and the paste-like substance is interposed between the workpiece and the surface of the fixing jig, by which either of the liquid substance, the cream-like substance and the paste-like substance is cooled and frozen thereby adhering and fixing the workpiece to the fixing jig, charging the workpiece into a tank filled with a fluid at a temperature higher than the freezing temperature of either of the liquid substance, the cream-like substance and the paste-like substance thereby melting either of the liquid substance, the cream-like substance and the paste-like substance and separating either of the liquid substance, the cream-like substance and the paste-like substance from the workpiece, and freezing and recovering either of the liquid substance, the cream-like substance and the paste-like substance by charging either of the liquid substance, the cream-like substance and the paste-like substance into a tank at a temperature lower than the freezing temperature.

* * * * *